United States Patent
Ly et al.

(10) Patent No.: US 12,074,673 B2
(45) Date of Patent: Aug. 27, 2024

(54) CHANNEL STATE INFORMATION (CSI) REPORT STRUCTURE FOR DYNAMIC ANTENNA PORT ADAPTATION

(71) Applicant: QUALCOMM Incorporated, San Diego, CA (US)

(72) Inventors: Hung Dinh Ly, San Diego, CA (US); Yu Zhang, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 147 days.

(21) Appl. No.: 17/827,569

(22) Filed: May 27, 2022

(65) Prior Publication Data

US 2023/0387988 A1 Nov. 30, 2023

(51) Int. Cl.
*H04L 5/12* (2006.01)
*H04B 7/06* (2006.01)
*H04B 7/08* (2006.01)

(52) U.S. Cl.
CPC ......... *H04B 7/0623* (2013.01); *H04B 7/0608* (2013.01); *H04B 7/0632* (2013.01); *H04B 7/0802* (2013.01)

(58) Field of Classification Search
CPC .. H04B 7/0623; H04B 7/0608; H04B 7/0632; H04B 7/0802
USPC ................ 375/262, 261, 259, 219, 295, 316
See application file for complete search history.

(56) References Cited

U.S. PATENT DOCUMENTS

2021/0320704 A1* 10/2021 Hao ..................... H04B 7/0632
2021/0409991 A1* 12/2021 Park ..................... H04L 5/0044

* cited by examiner

*Primary Examiner* — Zewdu A Kassa
(74) *Attorney, Agent, or Firm* — Arun Swain

(57) ABSTRACT

This disclosure provides systems, methods and apparatus, including computer programs encoded on computer storage media, for channel state information (CSI) report structure for dynamic antenna port adaptation. In some aspects, a user equipment (UE) and a network entity may support a CSI report configuration according to which the UE may include a respective set of CSI parameters for each of multiple codebooks. For example, the UE may compute a respective set of CSI parameters for each of multiple codebooks in accordance with a CSI report configuration and may transmit a CSI report including the respective sets of CSI parameters for each of the multiple codebooks. The network entity may use the respective sets of CSI parameters for each of the multiple codebooks to inform a dynamic antenna panel configuration update at the network entity.

26 Claims, 11 Drawing Sheets

CHANNEL STATE INFORMATION (CSI) REPORT STRUCTURE FOR DYNAMIC ANTENNA PORT ADAPTATION

TECHNICAL FIELD

This disclosure relates to wireless communications, including channel state information (CSI) report structure for dynamic antenna port adaptation.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (such as time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations (BSs) or one or more network access nodes, each simultaneously supporting communication for multiple communication devices, which may be otherwise known as user equipment (UE).

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communications at a user equipment (UE). The method may include receiving, via a control message, an indication of a channel state information (CSI) report configuration including a set of codebook parameters associated with a set of multiple codebooks, the set of multiple codebooks associated with a set of multiple CSI measurements at the UE and transmitting, via a CSI report, a set of CSI parameters for each of a subset of codebooks of the set of multiple codebooks.

Another innovative aspect of the subject matter described in this disclosure can be implemented in an apparatus for wireless communications at a UE. The apparatus may include an interface and a processing system. The interface may be configured to obtain, via a control message, an indication of a CSI report configuration including a set of codebook parameters associated with a set of multiple codebooks, the set of multiple codebooks associated with a set of multiple CSI measurements at the UE. The interface may be further configured to output, via a CSI report, a set of CSI parameters for each of a subset of codebooks of the set of multiple codebooks.

Another innovative aspect of the subject matter described in this disclosure can be implemented in an apparatus for wireless communications at a UE. The apparatus may include a processor, memory coupled with the processor, and instructions stored in the memory. The instructions may be executable by the processor to cause the apparatus to receive, via a control message, an indication of a CSI report configuration including a set of codebook parameters associated with a set of multiple codebooks, the set of multiple codebooks associated with a set of multiple CSI measurements at the UE and transmit, via a CSI report, a set of CSI parameters for each of a subset of codebooks of the set of multiple codebooks.

Another innovative aspect of the subject matter described in this disclosure can be implemented in another apparatus for wireless communications at a UE. The apparatus may include means for receiving, via a control message, an indication of a CSI report configuration including a set of codebook parameters associated with a set of multiple codebooks, the set of multiple codebooks associated with a set of multiple CSI measurements at the UE and means for transmitting, via a CSI report, a set of CSI parameters for each of a subset of codebooks of the set of multiple codebooks.

Another innovative aspect of the subject matter described in this disclosure can be implemented in a non-transitory computer-readable medium storing code for wireless communications at a UE. The code may include instructions executable by a processor to receive, via a control message, an indication of a CSI report configuration including a set of codebook parameters associated with a set of multiple codebooks, the set of multiple codebooks associated with a set of multiple CSI measurements at the UE and transmit, via a CSI report, a set of CSI parameters for each of a subset of codebooks of the set of multiple codebooks.

In some implementations of the method, apparatuses, and non-transitory computer-readable medium described herein, transmitting the set of CSI parameters for each of the subset of codebooks may include operations, features, means, or instructions for transmitting, via a first part of the CSI report, a channel quality indicator (CQI) parameter for a first codebook of the subset of codebooks and transmitting, via a second part of the CSI report, a CQI parameter for each of a remainder of the subset of codebooks.

One innovative aspect of the subject matter described in this disclosure can be implemented in a method for wireless communications at a network entity. The method may include transmitting, via a control message, an indication of a CSI report configuration including a set of codebook parameters associated with a set of multiple codebooks, the set of multiple codebooks associated with a set of multiple CSI measurements at a UE and receiving, via a CSI report, a set of CSI parameters for each of a subset of codebooks of the set of multiple codebooks.

Another innovative aspect of the subject matter described in this disclosure can be implemented in an apparatus for wireless communications at a network entity. The apparatus may include an interface and a processing system. The interface may be configured to output, via a control message, an indication of a CSI report configuration including a set of codebook parameters associated with a set of multiple codebooks, the set of multiple codebooks associated with a set of multiple CSI measurements at a UE. The interface may be further configured to obtain, via a CSI report, a set of CSI parameters for each of a subset of codebooks of the set of multiple codebooks.

Another innovative aspect of the subject matter described in this disclosure can be implemented in an apparatus for wireless communications at a network entity. The apparatus may include a processor, memory coupled with the processor, and instructions stored in the memory. The instructions may be executable by the processor to cause the apparatus to transmit, via a control message, an indication of a CSI report configuration including a set of codebook parameters associated with a set of multiple codebooks, the set of multiple codebooks associated with a set of multiple CSI measurements at a UE and receive, via a CSI report, a set of CSI parameters for each of a subset of codebooks of the set of multiple codebooks.

Another innovative aspect of the subject matter described in this disclosure can be implemented in another apparatus for wireless communications at a network entity. The apparatus may include means for transmitting, via a control message, an indication of a CSI report configuration including a set of codebook parameters associated with a set of multiple codebooks, the set of multiple codebooks associated with a set of multiple CSI measurements at a UE and means for receiving, via a CSI report, a set of CSI parameters for each of a subset of codebooks of the set of multiple codebooks.

Another innovative aspect of the subject matter described in this disclosure can be implemented in a non-transitory computer-readable medium storing code for wireless communications at a network entity. The code may include instructions executable by a processor to transmit, via a control message, an indication of a CSI report configuration including a set of codebook parameters associated with a set of multiple codebooks, the set of multiple codebooks associated with a set of multiple CSI measurements at a UE and receive, via a CSI report, a set of CSI parameters for each of a subset of codebooks of the set of multiple codebooks.

In some implementations of the method, apparatuses, and non-transitory computer-readable medium described herein, receiving the set of CSI parameters for each of the subset of codebooks may include operations, features, means, or instructions for receiving, via a first part of the CSI report, a CQI parameter for a first codebook of the subset of codebooks and receiving, via a second part of the CSI report, a CQI parameter for each of a remainder of the subset of codebooks.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
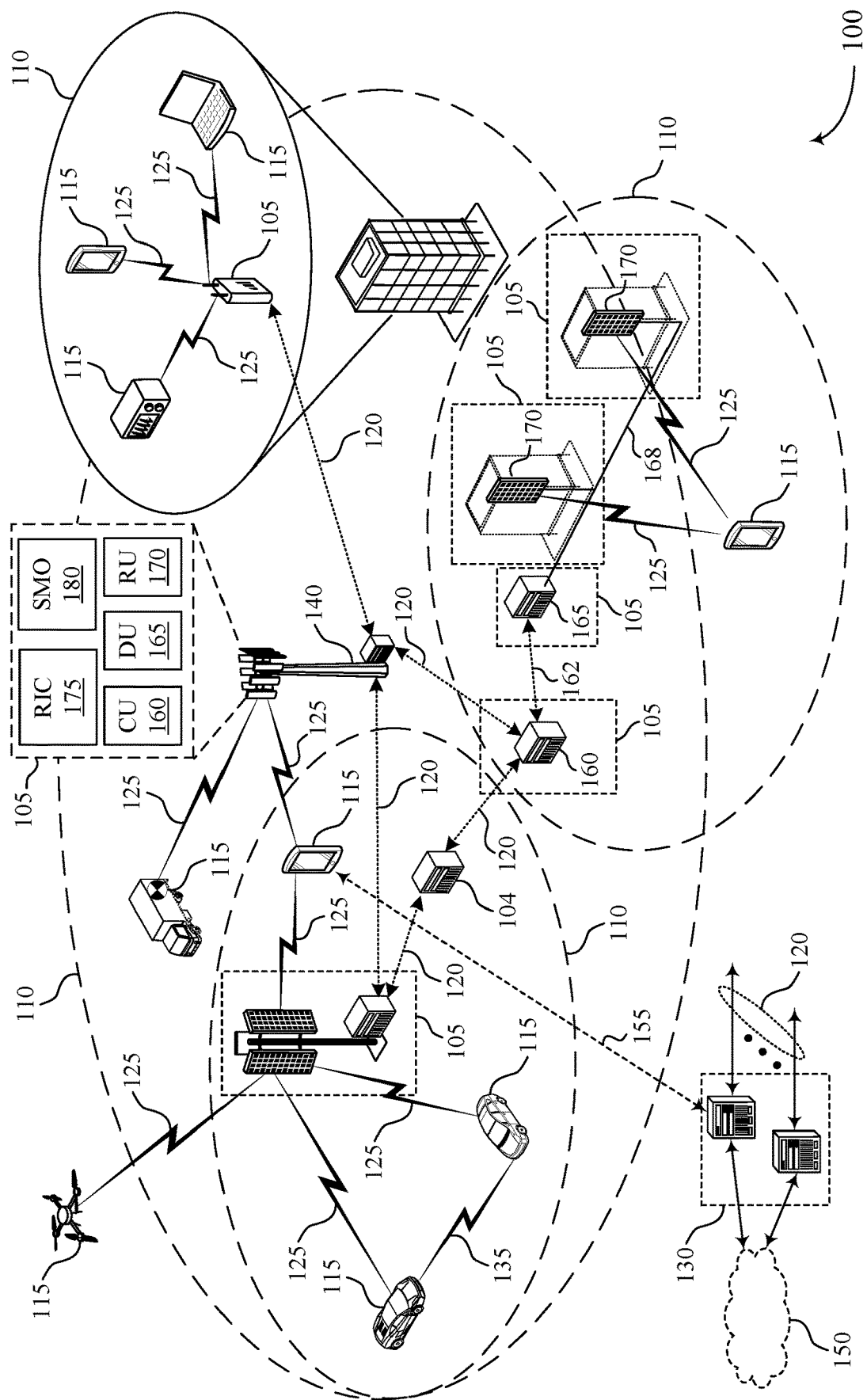
FIG. 1 shows an example wireless communications system that supports a channel state information (CSI) report structure for dynamic antenna port adaptation.

The following description is directed to some implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving radio frequency (RF) signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing third generation (3G), fourth generation (4G) or fifth generation (5G), or further implementations thereof, technology.

In some wireless communications systems, a network entity may support or operate multiple co-located antenna panels, each including or associated with multiple antenna ports. In some deployments, the network entity may use one or more of the multiple co-located antenna panels to support multiple-input multiple-output (MIMO) communication, such as massive MIMO communication. Each panel may be equipped with one or more transceiver chains with power amplifiers (PAs) and an antenna subsystem, which may consume a relatively large amount of power at the network entity. As such, the network entity may dynamically turn off one or more panels, sub-panels, transceiver chains, or antenna ports to save power and achieve greater energy efficiency if a cell load is relatively low (such as if the network entity can use less than all of its panels for communication). The network entity may attempt to dynamically turn off one or more panels, sub-panels, transceiver chains, or antenna ports in a manner that maintains connectivity or sufficient channel conditions between the network entity and a UE with which the network entity communicates. To maintain connectivity or sufficient channel conditions, the network entity may rely on channel measurements made at the UE for different codebooks (such as for different antenna panel or port configurations), which the UE may provide to the network entity via a channel state information (CSI) report. In some systems, a CSI report may be associated with a format or design that is limited to conveying information associated with a single codebook configuration, which may hinder dynamic port selection at the network entity or result in lost connectivity or poor channel conditions between the network entity and the UE (such as due to a lack of CSI at the network entity when the network entity decides which antenna panels to turn off).

In some implementations of the present disclosure, a UE and a network entity may support a CSI report structure that is capable of conveying CSI associated with multiple codebooks in one CSI report, which may facilitate dynamic antenna adaptation at the network entity (as the network entity may obtain CSI associated with various different codebooks with low latency, such as via a single CSI report). For example, the UE may receive an indication of a CSI report configuration indicating a set of codebook parameters associated with a set of codebooks and the UE may select, compute, calculate, measure, or otherwise determine one or more CSI parameters associated with a set of CSI reference signals (CSI-RSs) in accordance with the set of codebook parameters. The UE, in accordance with the CSI report configuration, may transmit a CSI report indicating a respective set of CSI parameters for each of at least a subset of codebooks of the multiple different codebooks. In some implementations, the UE may transmit the CSI report in multiple parts, including a first part and a second part. In such implementations, the UE may distribute the CSI parameters associated with the subset of codebooks across the multiple parts of the CSI report in accordance with the supported CSI report structure. Further, the UE and the network entity may support one or more dropping rules according to which the UE may drop one or more CSI parameters if an allocated uplink resource is insufficient to carry all of the CSI parameters for the subset of codebooks.

Particular implementations of the subject matter described in this disclosure can be implemented to realize one or more of the following potential advantages. For example, as a result of conveying a respective set of CSI parameters for each of potentially multiple codebooks, the UE may provide the network entity with CSI associated with various antenna configurations, which may inform a dynamic antenna port configuration at the network entity. As such, the network entity may achieve greater power savings while maintaining a sufficient link quality between the network entity and the UE. Further, in accordance with including a set of CSI parameters for each of multiple codebooks in a same CSI report, the UE may use a same (such as a single) uplink channel resource (such as a same physical uplink control channel (PUCCH) resource or a same physical uplink shared channel (PUSCH) resource) for the same CSI report, which may save uplink resources (as the UE may use fewer uplink resources to convey the multiple sets of CSI parameters) and reduce report latency. Similarly, the network entity may use fewer downlink resources in accordance with transmitting a CSI report configuration indicating codebook parameters for multiple codebooks and receiving the single CSI report including a set of CSI parameters for each of multiple codebooks (as the single CSI report may facilitate less configuration signaling by the network entity). Accordingly, the UE and the network entity may maintain sufficient data rates, spectral efficiency, and system capacity while also reducing power consumption at the network entity, which may facilitate greater adoption and expansion of wireless networks, which may in turn further increase connectivity, use experiences, data rates, and operational performance of various applications associated with a given network deployment.

FIG. 1 shows an example wireless communications system 100 that supports a CSI report structure for dynamic antenna port adaptation. The wireless communications system 100 may include one or more network entities 105, one or more UEs 115, and a core network 130. In some implementations, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some implementations, network entities 105 and UEs 115 may wirelessly communicate via one or more communication links 125 (such as a radio frequency (RF) access link). For example, a network entity 105 may support a coverage area 110 (such as a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (such as any network entity described herein), a UE 115 (such as any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some implementations, network entities 105 may communicate with the core network 130, or with one another, or both. For example, network entities 105 may communicate with the core network 130 via one or more backhaul communication links 120 (such as in accordance with an S1, N2, N3, or other interface protocol). In some implementations, network entities 105 may communicate with one another over a backhaul communication link 120 (such as in accordance with an X2, Xn, or other interface protocol) either directly (such as directly between network entities 105) or indirectly (such as via a core network 130). In some implementations, network entities 105 may communicate with one another via a midhaul communication link 162 (such as in accordance with a midhaul interface protocol) or a fronthaul communication link 168 (such as in accordance with a fronthaul interface protocol), or any combination thereof. The backhaul communication links 120, midhaul communication links 162, or fronthaul communication links 168 may be or include one or more wired links (such as an electrical link, an optical fiber link), one or more wireless links (such as a radio link, a wireless optical link), among other examples or various combinations thereof. A UE 115 may communicate with the core network 130 through a communication link 155.

One or more of the network entities 105 described herein may include or may be referred to as a base station (BS) 140 (such as a base transceiver station, a radio BS, an NR BS, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some implementations, a network entity 105 (such as a BS 140) may be implemented in an aggregated (such as monolithic, stand-alone) BS architecture, which may be configured to utilize a protocol stack that is physically or logically integrated within a single network entity 105 (such as a single RAN node, such as a BS 140).

In some implementations, a network entity 105 may be implemented in a disaggregated architecture (such as a disaggregated BS architecture, a disaggregated RAN architecture), which may be configured to utilize a protocol stack that is physically or logically distributed among two or more network entities 105, such as an integrated access backhaul (IAB) network, an open RAN (O-RAN) (such as a network configuration sponsored by the O-RAN Alliance), or a virtualized RAN (vRAN) (such as a cloud RAN (C-RAN)). For example, a network entity 105 may include one or more of a central unit (CU) 160, a distributed unit (DU) 165, a radio unit (RU) 170, a RAN Intelligent Controller (RIC) 175 (such as a Near-Real Time RIC (Near-RT RIC), a Non-Real Time RIC (Non-RT RIC)), a Service Management and Orchestration (SMO) 180 system, or any combination thereof. An RU 170 also may be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (such as separate physical locations). In some implementations, one or more network entities 105 of a disaggregated RAN architecture may be implemented as virtual units (such as a virtual CU (VCU), a virtual DU (VDU), a virtual RU (VRU)).

The split of functionality between a CU 160, a DU 165, and an RU 170 is flexible and may support different functionalities depending upon which functions (such as network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some implementations, the CU 160 may host upper protocol layer (such as layer 3 (L3), layer 2 (L2)) functionality and signaling (such as Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (such as physical (PHY) layer) or L2 (such as radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (such as via one or more RUs 170). In some implementations, a functional split between a CU 160 and a DU 165, or between a DU 165 and an RU 170 may be within a protocol layer (such as some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (such as F1, F1-c, F1-u), and a DU 165 may be connected to one or more RUs 170 via a fronthaul communication link 168 (such as open fronthaul (FH) interface). In some implementations, a midhaul communication link 162 or a fronthaul communication link 168 may be implemented in accordance with an interface (such as a channel) between layers of a protocol stack supported by respective network entities 105 that are in communication over such communication links.

In wireless communications systems (such as wireless communications system 100), infrastructure and spectral resources for radio access may support wireless backhaul link capabilities to supplement wired backhaul connections, providing an IAB network architecture (such as to a core network 130). In some implementations, in an IAB network, one or more network entities 105 (such as IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (such as a donor BS 140). The one or more donor network entities 105 (such as IAB donors) may be in communication with one or more additional network entities 105 (such as IAB nodes 104) via supported access and backhaul links (such as backhaul communication links 120). IAB nodes 104 may include an IAB mobile termination (IAB-MT) controlled (such as scheduled) by DUs 165 of a coupled IAB donor. An IAB-MT may include an independent set of antennas for relay of communications with UEs 115, or may share the same antennas (such as of an RU 170) of an IAB node 104 used for access via the DU 165 of the IAB node 104 (such as referred to as virtual IAB-MT (vIAB-MT)). In some implementations, the IAB nodes 104 may include DUs 165 that support communication links with additional entities (such as IAB nodes 104, UEs 115) within the relay chain or configuration of the access network (such as downstream). In such implementations, one or more components of the disaggregated RAN architecture (such as one or more IAB nodes 104 or components of IAB nodes 104) may be configured to operate according to the techniques described herein.

For instance, an access network (AN) or RAN may include communications between access nodes (such as an IAB donor), IAB nodes 104, and one or more UEs 115. The IAB donor may facilitate connection between the core network 130 and the AN (such as via a wired or wireless connection to the core network 130). That is, an IAB donor may refer to a RAN node with a wired or wireless connection to core network 130. The IAB donor may include a CU 160 and at least one DU 165 (such as and RU 170), in which implementation the CU 160 may communicate with the core network 130 over an interface (such as a backhaul link). IAB donor and IAB nodes 104 may communicate over an F1 interface according to a protocol that defines signaling messages (such as an F1 AP protocol). Additionally, or alternatively, the CU 160 may communicate with the core network over an interface, which may be an example of a portion of backhaul link, and may communicate with other CUs 160 (such as a CU 160 associated with an alternative IAB donor) over an Xn-C interface, which may be an example of a portion of a backhaul link.

An IAB node 104 may refer to a RAN node that provides IAB functionality (such as access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (such as an IAB donor may relay transmissions for UEs through one or more other IAB nodes 104). Additionally, or alternatively, an IAB node 104 also may be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (such as DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (such as a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (such as transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by a DU 165 of IAB donor and communications with IAB node 104 may be scheduled by DU 165 of IAB node 104.

In the implementation of the techniques described herein applied in the context of a disaggregated RAN architecture, one or more components of the disaggregated RAN architecture may be configured to support a CSI report structure for dynamic antenna port adaptation as described herein. For example, some operations described as being performed by a UE 115 or a network entity 105 (such as a BS 140) may additionally, or alternatively, be performed by one or more components of the disaggregated RAN architecture (such as IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" also may be referred to as a unit, a station, a terminal, or a client, among other examples. A UE 115 also may include or may be referred to as a personal electronic device such as a cellular phone, a personal digital assistant (PDA), a tablet computer, a laptop computer, or a personal computer. In some implementations, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay BSs, among other examples, as shown in FIG. 1.

The UEs 115 and the network entities 105 may wirelessly communicate with one another via one or more communication links 125 (such as an access link) over one or more carriers. The term "carrier" may refer to a set of RF spectrum resources having a defined physical layer structure for supporting the communication links 125. For example, a carrier used for a communication link 125 may include a portion of a RF spectrum band (such as a bandwidth part (BWP)) that is operated according to one or more physical layer channels for a given radio access technology (such as LTE, LTE-A, LTE-A Pro, NR). Each physical layer channel may carry acquisition signaling (such as synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (such as entity, sub-entity) of a network entity 105. For example, the terms "transmitting," "receiving," or "communicating," when referring to a network entity 105, may refer to any portion of a network entity 105 (such as a BS 140, a CU 160, a DU 165, a RU 170) of a RAN communicating with another device (such as directly or via one or more other network entities 105).

Signal waveforms transmitted over a carrier may be made up of multiple subcarriers (such as using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (such as a duration of one modulation symbol) and one subcarrier, in which implementation the symbol period and subcarrier spacing may be inversely related. The quantity of bits carried by each resource element may depend on the modulation scheme (such as the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (such as a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some implementations, a UE 115 may be configured with multiple BWPs. In some implementations, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (such as 10 milliseconds (ms)). Each radio frame may be identified by a system frame number (SFN) (such as ranging from 0 to 1023).

Each frame may include multiple consecutively numbered subframes or slots, and each subframe or slot may have the same duration. In some implementations, a frame may be divided (such as in the time domain) into subframes, and each subframe may be further divided into a quantity of slots. Alternatively, each frame may include a variable quantity of slots, and the quantity of slots may depend on subcarrier spacing. Each slot may include a quantity of symbol periods (such as depending on the length of the cyclic prefix prepended to each symbol period). In some wireless communications systems 100, a slot may further be divided into multiple mini-slots containing one or more symbols. Excluding the cyclic prefix, each symbol period may contain one or more (such as $N_f$) sampling periods. The duration of a symbol period may depend on the subcarrier spacing or frequency band of operation.

A subframe, a slot, a mini-slot, or a symbol may be the smallest scheduling unit (such as in the time domain) of the wireless communications system 100 and may be referred to as a transmission time interval (TTI). In some implementations, the TTI duration (such as a quantity of symbol periods in a TTI) may be variable. Additionally, or alternatively, the smallest scheduling unit of the wireless communications system 100 may be dynamically selected (such as in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (such as a control resource set (CORESET)) for a physical control channel may be defined by a set of symbol periods and may extend across the system bandwidth or a subset of the system bandwidth of the carrier. One or more control regions (such as CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (such as control channel elements (CCEs)) associated with encoded information for a control information format having a given payload size. Search space sets may include common search space sets configured for sending control information to multiple UEs 115 and UE-specific search space sets for sending control information to a specific UE 115.

In some implementations, a network entity 105 (such as a BS 140, an RU 170) may be movable and therefore provide communication coverage for a moving coverage area 110. In some implementations, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some implementations, a UE 115 may be able to communicate directly with other UEs 115 over a device-to-device (D2D) communication link 135 (such as in accordance with a peer-to-peer (P2P), D2D, or sidelink protocol). In some implementations, one or more UEs 115 of a group that are performing D2D communications may be within the coverage area 110 of a network entity 105 (such as a BS 140, an RU 170), which may support aspects of such D2D communications being configured by or scheduled by the network entity 105. In some implementations, one or more UEs 115 in such a group may be outside the coverage area 110 of a network entity 105 or may be otherwise unable to or not configured to receive transmissions from a network entity 105. In some implementations, groups of the UEs 115 communicating via D2D communications may support a one-to-many (1:M) system in which each UE 115 transmits to each of the other UEs 115 in the group. In some implementations, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC)

or 5G core (5GC), which may include at least one control plane entity that manages access and mobility (such as a mobility management entity (MME), an access and mobility management function (AMF)) and at least one user plane entity that routes packets or interconnects to external networks (such as a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (such as BSs 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (such as less than 100 kilometers) compared to transmission using the smaller frequencies and longer waves of the high frequency (HF) or very high frequency (VHF) portion of the spectrum below 300 MHz.

The wireless communications system 100 also may operate in a super high frequency (SHF) region using frequency bands from 3 GHz to 30 GHz, also known as the centimeter band, or in an extremely high frequency (EHF) region of the spectrum (such as from 30 GHz to 300 GHz), also known as the millimeter band. In some implementations, the wireless communications system 100 may support millimeter wave (mmW) communications between the UEs 115 and the network entities 105 (such as BSs 140, RUs 170), and EHF antennas of the respective devices may be smaller and more closely spaced than UHF antennas. In some implementations, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some implementations, operations in unlicensed bands may be associated with a carrier aggregation configuration in conjunction with component carriers operating in a licensed band (such as LAA). Operations in unlicensed spectrum may include downlink transmissions, uplink transmissions, P2P transmissions, or D2D transmissions, among other examples.

A network entity 105 (such as a BS 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more BS antennas or antenna arrays may be co-located at an antenna assembly, such as an antenna tower. In some implementations, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (such as the same codeword) or different data streams (such as different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which also may be referred to as spatial filtering, directional transmission, or directional reception, is a signal processing technique that may be used at a transmitting device or a receiving device (such as a network entity 105, a UE 115) to shape or steer an antenna beam (such as a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (such as with respect to the antenna array of the transmitting device or receiving device, or with respect to some other orientation).

In some systems, such as the wireless communications system 100, a network entity 105 and a UE 115 may support a CSI reporting structure that the UE 115 may use if CSI for multiple codebooks (which may be equivalently understood as multiple CSIs) are to be reported in one CSI report. Such a CSI reporting structure may support or otherwise facilitate dynamic antenna adaptation at the network entity 105. In some implementations, the UE 115 may generate the CSI report in multiple parts, including a first part of the CSI report (which may be referred to herein as a CSI report part 1) and a second part of the CSI report (which may be referred to herein as a CSI report part 2). In such implementations, the UE 115 may include a first set of one or more CSI parameters in the first part of the CSI report (which may have a fixed size) and may include a second set of one or more CSI parameters in the second part of the CSI report (which may have a variable size).

Further, the UE 115 and the network entity 105 may support a dropping rule according to which the UE 115 may sequentially drop specific CSI parameters (or drop CSI parameters from a specific part of the CSI report). As such, if there are insufficient uplink resources to convey all CSI parameters for each of the multiple codebooks, the UE 115 and the network entity 105 may trigger or activate the dropping rule. For example, the dropping rule may be defined such that the UE 115 completely or partially drops the second part of the CSI report first, partially drops the first part of the CSI report second, and completely drops the first part of the CSI report third.

Figure 2:
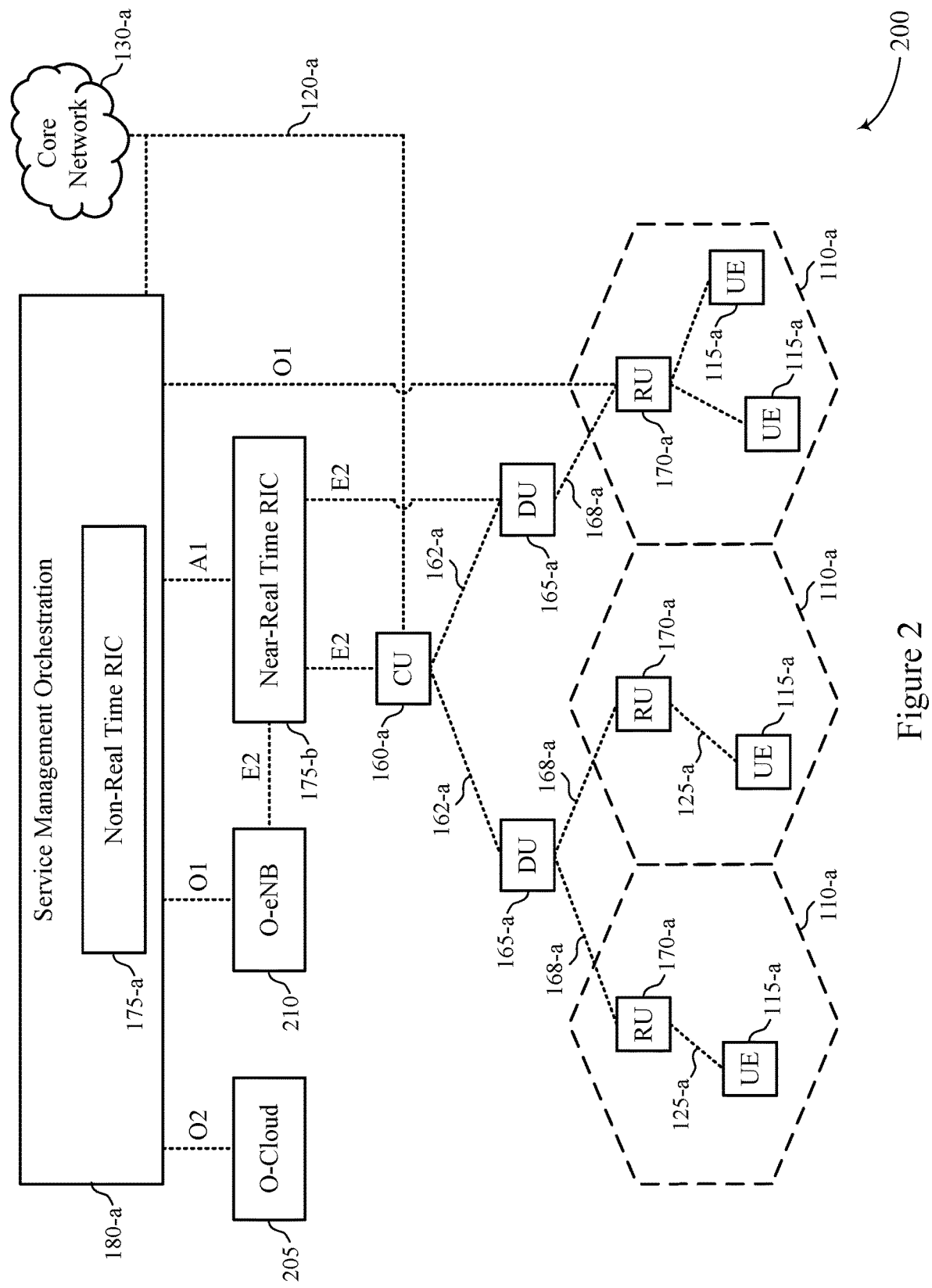
FIG. 2 shows an example network architecture that supports a CSI report structure for dynamic antenna port adaptation.

FIG. 2 shows an example network architecture 200 (such as a disaggregated base station architecture, a disaggregated RAN architecture) that supports a CSI report structure for dynamic antenna port adaptation. The network architecture 200 may illustrate an example for implementing one or more aspects of the wireless communications system 100. The network architecture 200 may include one or more CUs 160-a that may communicate directly with a core network 130-a via a backhaul communication link 120-a, or indirectly with the core network 130-a through one or more disaggregated network entities 105 (such as a Near-RT RIC 175-b via an E2 link, or a Non-RT RIC 175-a associated with an SMO 180-a (such as an SMO Framework), or both). A CU 160-a may communicate with one or more DUs 165-a via respective midhaul communication links 162-a (such as an F1 interface). The DUs 165-a may communicate with one or more RUs 170-a via respective fronthaul communication links 168-a. The RUs 170-a may be associated with respective coverage areas 110-a and may communicate with UEs 115-a via one or more communication links 125-a. In some implementations, a UE 115-a may be simultaneously served by multiple RUs 170-a.

Each of the network entities 105 of the network architecture 200 (such as CUs 160-a, DUs 165-a, RUs 170-a, Non-RT RICs 175-a, Near-RT RICs 175-b, SMOs 180-a, Open Clouds (O-Clouds) 205, Open eNBs (O-eNBs) 210) may include one or more interfaces or may be coupled with one or more interfaces configured to receive or transmit signals (such as data, information) via a wired or wireless transmission medium. Each network entity 105, or an associated processor (such as controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (such as an RF transceiver) configured to receive or transmit signals, or both, over a wireless transmission medium to one or more of the other network entities 105.

In some implementations, a CU 160-a may host one or more higher layer control functions. Such control functions may include RRC, PDCP, SDAP, or the like. Each control function may be implemented with an interface configured to communicate signals with other control functions hosted by the CU 160-a. A CU 160-a may be configured to handle user plane functionality (such as CU-UP), control plane functionality (such as CU-CP), or a combination thereof. In some implementations, a CU 160-a may be logically split into one or more CU-UP units and one or more CU-CP units. A CU-UP unit may communicate bidirectionally with the CU-CP unit via an interface, such as an E1 interface when implemented in an O-RAN configuration. A CU 160-a may be implemented to communicate with a DU 165-a, as necessary, for network control and signaling.

A DU 165-a may correspond to a logical unit that includes one or more functions (such as base station functions, RAN functions) to control the operation of one or more RUs 170-a. In some implementations, a DU 165-a may host, at least partially, one or more of an RLC layer, a MAC layer, and one or more aspects of a PHY layer (such as a high PHY layer, such as modules for FEC encoding and decoding, scrambling, modulation and demodulation, or the like) depending, at least in part, on a functional split, such as those defined by the 3rd Generation Partnership Project (3GPP). In some implementations, a DU 165-a may further host one or more low PHY layers. Each layer may be implemented with an interface configured to communicate signals with other layers hosted by the DU 165-a, or with control functions hosted by a CU 160-a.

In some implementations, lower-layer functionality may be implemented by one or more RUs 170-a. For example, an RU 170-a, controlled by a DU 165-a, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-a may be implemented to handle over the air (OTA) communication with one or more UEs 115-a. In some implementations, real-time and non-real-time aspects of control and user plane communication with the RU(s) 170-a may be controlled by the corresponding DU 165-a. In some implementations, such a configuration may enable a DU 165-a and a CU 160-a to be implemented in a cloud-based RAN architecture, such as a vRAN architecture.

The SMO 180-a may be configured to support RAN deployment and provisioning of non-virtualized and virtualized network entities 105. For non-virtualized network entities 105, the SMO 180-a may be configured to support the deployment of dedicated physical resources for RAN coverage requirements which may be managed via an operations and maintenance interface (such as an O1 interface). For virtualized network entities 105, the SMO 180-a may be configured to interact with a cloud computing platform (such as an O-Cloud 205) to perform network entity life cycle management (such as to instantiate virtualized network entities 105) via a cloud computing platform interface (such as an O2 interface). Such virtualized network entities 105 can include, but are not limited to, CUs 160-a, DUs 165-a, RUs 170-a, and Near-RT RICs 175-b. In some implementations, the SMO 180-a may communicate with components configured in accordance with a 4G RAN (such as via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (such as via an A1 interface) the Near-RT RIC 175-*b*. The Near-RT RIC 175-*b* may be configured to include a logical function that enables near-real-time control and optimization of RAN elements and resources via data collection and actions over an interface (such as via an E2 interface) connecting one or more CUs 160-*a*, one or more DUs 165-*a*, or both, as well as an O-eNB 210, with the Near-RT RIC 175-*b*.

In some implementations, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some implementations, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (such as reconfiguration via O1) or via generation of RAN management policies (such as A1 policies).

In accordance with the example implementations described herein, various devices, components, entities, or nodes of the network architecture 200 may support a CSI report structure according to which a UE 115 may transmit, indicate, or otherwise convey information associated with multiple CSIs (such as CSI parameters associated with multiple codebooks). As described herein, a codebook may correspond to an antenna panel or antenna port configuration at one or both of a network entity 105 and the UE 115, and may be equivalently understood or referred to as a codebook configuration. For example, the UE 115 may select, compute, calculate, measure, ascertain, or otherwise determine CSI parameters for different codebooks in accordance with receiving or measuring different sets of CSI-RSs, where the network entity 105 may transmit each different set of CSI-RSs using a different antenna panel or antenna port configuration. The UE 115 may maintain a same antenna panel or antenna port configuration or may switch to different antenna panel or antenna port configurations when receiving the different sets of CSI-RSs.

Further, any one or more components of a network entity 105 may initiate or configure dynamic antenna port adaptation. In some implementations, a DU 165-*a* of the network entity 105 may initiate or configure the dynamic antenna port adaptation. In some deployment scenarios, a DU 165-*a* of a network entity 105 may initiate or configure the dynamic antenna port adaptation to coordinate antenna port updates, adaptations, or changes across multiple RUs 170-*a* (where each RU 170-*a* may be associated with one or more antenna panels). Additionally, or alternatively, a CU 160-*a* of a network entity 105 may initiate or configure the dynamic antenna port adaptation. In some deployment scenarios, a CU 160-*a* of a network entity 105 may initiate or configure the dynamic antenna port adaptation to coordinate antenna port updates, adaptations, or changes across multiple DUs 165-*a*. Similarly, the CSI that a UE 115 may provide to a network entity 105 may be associated with channels or links between the UE 115 and any one or more RUs 170-*a* or DUs 165-*a* of the network entity 105.

Figure 3:
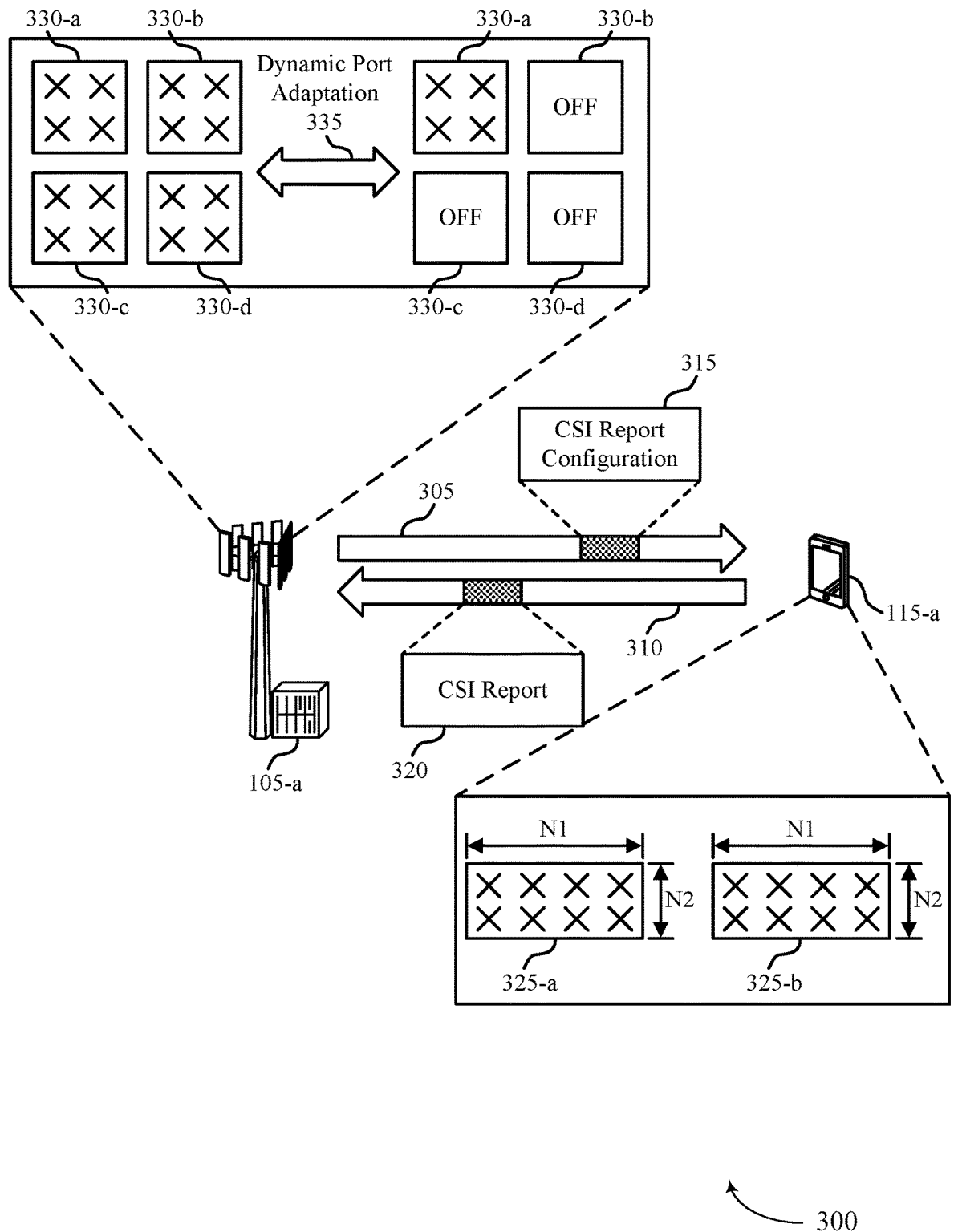
FIG. 3 shows an example signaling diagram that supports a CSI report structure for dynamic antenna port adaptation.

FIG. 3 shows an example signaling diagram 300 that supports a CSI report structure for dynamic antenna port adaptation. The signaling diagram 300 may implement or be implemented to realize aspects of the wireless communications system 100 or the network architecture 200. For example, the signaling diagram 300 illustrates communication between a UE 115-*a* and a network entity 105-*a*. The UE 115-*a* may be an example of a UE 115 as illustrated by and described with reference to FIG. 1. The network entity 105-*a* may be an example of a network entity 105 as illustrated by and described with reference to FIG. 1. In some implementations, the UE 115-*a* and the network entity 105-*a* may support a CSI report structure according to which the UE 115-*a* may transmit or convey a set of CSI parameters for each of multiple codebooks (such as for each of multiple codebook configurations), which may enable dynamic antenna configuration or adaptation and greater energy efficiency at the network entity 105-*a*.

In some systems, for example, a network energy consumption to run, manage, or operate a cellular network may be associated with a relatively high cost (such as approximately 15-30% of a total energy expense). Further, in some systems, a relatively large percentage of the network energy consumption may come from a radio access network (RAN). For example, the RAN may account for or otherwise be responsible for approximately 40-60% of the energy expense of a system (such as a 5G system). Further, energy (such as power) consumption at the network entity 105-*a* may be even greater in some 5G deployment scenarios. For example, if the network entity 105-*a* supports or manages MIMO communication (such as 5G massive MIMO communication), the network entity 105-*a* may consume a greater amount of power as compared to a network entity 105 in another deployment scenario (such as a 4G deployment scenario).

For example, the UE 115-*a* and the network entity 105-*a* may support MIMO communication via a downlink 305 or an uplink 310, or both. To support the MIMO communication, the UE 115-*a* may support or operate an antenna panel 325-*a* and an antenna panel 325-*b*, and the network entity 105-*a* may support an antenna panel 330-*a*, an antenna panel 330-*b*, an antenna panel 330-*c*, and an antenna panel 330-*d*. In some aspects, one or more of the antenna panels 330 (which may generally or collectively refer to the antenna panel 330-*a*, the antenna panel 330-*b*, the antenna panel 330-*c*, and the antenna panel 330-*d*) may be co-located and each may be associated with multiple antenna ports. Additionally, each panel may be equipped with one or more transceiver chains with a relatively large quantity of PAs and one or more antenna subsystems, which may consume a relatively large amount of power. In other words, each antenna panel may be equipped with one or more transceiver chains and each of the one or more transceiver chains may include or may otherwise be associated with one or more PAs and one or more antenna subsystems, which may consume a relatively large amount of power.

As such, network energy saving features may be crucial for adoption and expansion of cellular networks. To support network energy saving features, the network entity 105-*a* may support an adapted framework of power consumption modeling and evaluation methodology to the network side, including relative energy consumption for downlink and uplink, sleep states and associated transition times, and one or more reference parameters or configurations. In some aspects, if the network entity 105-a supports modeling and evaluation methodology associated with a relative energy consumption for downlink and uplink, the network entity 105-a may consider factors such as PA efficiency, a quantity of transmitting RUs, or a load (such as amount of data traffic) at the network entity 105-a, among other example factors that may influence power usage across uplink and downlink communication.

The network entity 105-a may further support an evaluation methodology that targets evaluating system-level network energy consumption and energy saving gains, as well as assessing or balancing an impact to the network and user performance (such as spectral efficiency, capacity, user perceived throughput (UPT), latency, handover performance, call drop rate, initial access performance, or service level agreement (SLA) assurance related key performance indicators (KPIs)), energy efficiency, UE power consumption, and complexity. In some aspects, the evaluation methodology may not focus on a single KPI and may reuse existing KPIs as applicable while incorporating additional KPIs if existing KPIs are found to be insufficient.

Accordingly, the network entity 105-a (and the UE 115-a) may support techniques to increase network energy savings in terms of both network-side transmission and reception. In some implementations, for example, the network entity 105-a may support more efficient operations associated with dynamically or semi-statically (or at finer granularity) adapting transmissions or receptions using one or more network energy saving techniques in time, frequency, spatial, or power domains. In such implementations, the UE 115-a may provide support or feedback (such as UE assistance information) to the network entity 105-a to support such dynamic or semi-static network energy saving techniques. The network entity 105-a may additionally, or alternatively, support information exchange or coordination via network interfaces to support such dynamic or semi-static network energy saving techniques.

In an example energy saving technique, the network entity 105-a may dynamically decide to turn off one or more panels (such as one or more of the antenna panel 330-a, the antenna panel 330-b, the antenna panel 330-c, and the antenna panel 330-d), sub-panels, transceiver chains, or antenna ports to achieve greater energy efficiency if a cell load is relatively low (such as below a threshold cell load). For example, if the network entity 105-a is scheduled for or otherwise expects a relatively small amount of data traffic, the network entity 105-a may turn off (and no longer provide power to) one or more panels to reduce a total power consumption of the network entity 105-a. As illustrated by the signaling diagram 300, the network entity 105-a may perform a dynamic port adaptation 335 (which may be equivalently referred to as a dynamic antenna port adaptation) to switch off the antenna panel 330-b, the antenna panel 330-c, and the antenna panel 330-d.

In some implementations, the network entity 105-a may select which one or more antenna panels, sub-panels, transceiver chains, or antenna ports to turn off in accordance with CSI from the UE 115-a to avoid losing a connection with the UE 115-a or otherwise providing worse channel conditions between the network entity 105-a and the UE 115-a. As such, the network entity 105-a may configure or request the UE 115-a to provide CSI associated with potentially multiple antenna configurations at the network entity 105-a (such that the network entity 105-a may store the CSI and identify which antenna configurations of the network entity 105-a provide a sufficient link quality between the network entity 105-a and the UE 115-a).

To configure or request the UE 115-a to provide CSI to the network entity 105-a, the network entity 105-a may transmit an indication of a CSI report configuration 315 to the UE 115-a. The network entity 105-a may configure (such as radio resource control (RRC) configure) a CSI report configuration 315 per BWP and a CSI report configuration 315 may indicate a set of parameters and resources that the UE 115-a may use to select, obtain, compute, measure, or otherwise determine a set of CSI parameters. Additional details relating to the parameters and resources indicated by a CSI report configuration are illustrated and described with reference to FIG. 5.

The CSI report configuration 315 may define or be associated with one or more of a set of different types of codebook reporting. For example, the network entity 105-a and the UE 115-a may support different types of precoding matrix indicator (PMI) codebook reporting. The different types may include Type 1 single panel, Type 1 multiple panels, Type 2 single panel, Type 2 port selection, and Type 2 enhanced port selection. Further, the CSI report configuration 315 may indicate a set of parameters associated with an antenna configuration at one or both of the network entity 105-a or the UE 115-a. For example, the UE 115-a and the network entity 105-a may support specific settings of an antenna element configuration and a quantity of panels (such as active panels) for each codebook type and may support a corresponding quantity of CSI-RS antenna ports (per resource). In some aspects, an antenna element configuration may be denoted as ($N_1$, $N_2$), where $N_1$ may refer to a horizontal quantity of antenna elements on a panel and $N_2$ may refer to a vertical quantity of antenna elements on a panel. Further, a quantity of panels may be denoted as $N_g$ and, as such, a quantity of CSI-RS antenna ports corresponding to an ($N_g$, $N_1$, $N_2$) antenna configuration may be equal to $2N_gN_1N_2$ (because each antenna element may be associated with two different polarizations). In the example of the signaling diagram 300, the UE 115-a may support an antenna configuration ($N_g=2$, $N_1=4$, $N_2=2$).

Table 1 and Table 2, shown below, may show other supported configurations of ($N_1$, $N_2$) and ($N_g$, $N_1$, $N_2$), respectively. Tables 1 and 2 further show corresponding configurations of ($O_1$, $O_2$), where $O_1$ is associated with a beam sweeping step in a horizontal direction and $O_2$ is associated with a beam sweeping step in a vertical direction. Additionally, or alternatively, ($O_1$, $O_2$) may be associated with a DFT beam restriction (such as a limitation, constraint, or configuration) associated with the CSI report configuration 315.

TABLE 1

Supported Configurations of ($N_1$, $N_2$) and ($O_1$, $O_2$)

| Quantity of CSI-RS Antenna Ports, $P_{CSI-RS}$ | ($N_1$, $N_2$) | ($O_1$, $O_2$) |
|---|---|---|
| 4 | (2, 1) | (4, 1) |
| 8 | (2, 2) | (4, 4) |
|  | (4, 1) | (4, 1) |
| 12 | (3, 2) | (4, 4) |
|  | (6, 1) | (4, 1) |
| 16 | (4, 2) | (4, 4) |
|  | (8, 1) | (4, 1) |
| 24 | (4, 3) | (4, 4) |
|  | (6, 2) | (4, 4) |
|  | (12, 1) | (4, 1) |

TABLE 1-continued

Supported Configurations of ($N_1$, $N_2$) and ($O_1$, $O_2$)

| Quantity of CSI-RS Antenna Ports, $P_{CSI-RS}$ | ($N_1$, $N_2$) | ($O_1$, $O_2$) |
|---|---|---|
| 32 | (4, 4) | (4, 4) |
| | (8, 2) | (4, 4) |
| | (16, 1) | (4, 1) |

TABLE 2

Supported Configurations of ($N_g$, $N_1$, $N_2$) and ($O_1$, $O_2$)

| Quantity of CSI-RS Antenna Ports, $P_{CSI-RS}$ | ($N_g$, $N_1$, $N_2$) | ($O_1$, $O_2$) |
|---|---|---|
| 8 | (2, 2, 1) | (4, 1) |
| 16 | (2, 4, 1) | (4, 1) |
| | (4, 2, 1) | (4, 1) |
| | (2, 2, 2) | (4, 4) |
| 32 | (2, 8, 1) | (4, 1) |
| | (4, 4, 1) | (4, 1) |
| | (2, 4, 2) | (4, 4) |
| | (4, 2, 2) | (4, 4) |

In accordance with receiving the CSI report configuration 315, the UE 115-*a* may measure or estimate a channel using one or more CSI-RS resources and the set of codebook parameters indicated by the CSI report configuration 315. As such, the UE 115-*a* may select, compute, calculate, or otherwise obtain a set of CSI parameters and may transmit an indication of the set of CSI parameters to the network entity 105-*a* via a CSI report 320. The CSI report 320 may be associated with a format that depends on which type (such as Type 1 or Type 2) of codebook reporting the UE 115-*a* is configured to provide.

For Type 1, which may be associated with single-slot reporting, the UE 115-*a* may generate the CSI report 320 such that the CSI report 320 includes up to two parts. In a first part of the CSI report 320, the UE 115-*a* may include a rank indicator (RI), a CSI resource indicator (CRI), and a channel quality indicator (CQI) for a first codeword. In a second part of the CSI report 320, the UE 115-*a* may include a PMI and a CQI for a second codeword (in examples in which the RI is greater than a threshold value, such as when RI>4). The UE 115-*a* may provide a Type 1 CSI report 320 for periodic, semi-persistent, and aperiodic CSI and may transmit the CSI report 320 using or via a physical uplink control channel (PUCCH) or a physical uplink shared channel (PUSCH), such as a short or long PUCCH or PUSCH. For Type 1 sub-band CSI, the UE 115-*a* may transmit the CSI report 320 using a PUSCH or a long PUCCH.

For Type 2, the UE 115-*a* may similarly generate the CSI report 320 such that the CSI report 320 includes up to two parts. In a first part of the CSI report 320, the UE 115-*a* may include an RI, a CQI, and an indication of a quantity of non-zero wideband amplitude coefficients per layer. In some aspects, the first part of the CSI report 320 may have a fixed payload size, each field may be encoded separately, and the first part of the CSI report 320 may indicate or otherwise identify a quantity of information bits included in a second part of the CSI report 320. In the second part of the CSI report 320, the UE 115-*a* may include a PMI corresponding to the non-zero wideband amplitude coefficients per layer indicated in the first part of the CSI report 320. The UE 115-*a* may provide a Type 2 CSI report 320 for semi-persistent or aperiodic CSI and may transmit the CSI report 320 using a long PUCCH (for the first part of the CSI report 320) or a PUSCH (for either or both of the first part or the second part of the CSI report 320). In some aspects, the UE 115-*a* may not multiplex CSI parameters of the CSI report 320 across PUCCH or PUSCH transmissions and CSI reports using a long PUCCH and using a PUSCH may be calculated independently. Further, whether the UE 115-*a* can be configured with Type 2 CSI reports using both a long PUCCH and a PUSCH may be associated with (such as depend on) a UE capability, which the UE 115-*a* may indicate to the network entity 105-*a*. Layer 1-reference signal receive power (RSRP) and resource indicators for beam management may be mapped to a first part of a CSI report 320 if CSI is reported using a long PUCCH or PUSCH.

Each CSI parameter that the UE 115-*a* may include in the CSI report 320 may be associated with a field or a quantity of bits in the CSI report 320. Table 3, shown below, illustrates example quantities of bits (such as a bitwidth) that the UE 115-*a* may use to convey various different CSI parameters for different quantities of antenna ports. In Table 3, $n_{RI}$ may denote a quantity of allowed RI values, v may denote a value of a rank, and $K_s^{CSI-RS}$ may denote a quantity of CSI-RS resources in a corresponding resource set (a corresponding CSI-RS resource set). In some aspects, the values of the RI field may be mapped to allowed RI values with increasing order, where '0' may be mapped to a smallest allowed RI value.

TABLE 3

RI, LI, CQI, and CRI (of Codebook Type = Type 1, Single Panel)

| | Bitwidth | | | | |
|---|---|---|---|---|---|
| | | | | >4 Antenna Ports | |
| Field | 1 Antenna Port | 2 Antenna Ports | 4 Antenna Ports | Rank 1~4 | Rank 5~8 |
| RI | 0 | min(1, $\lceil \log_2(n_{RI}) \rceil$) | min(2, $\lceil \log_2(n_{RI}) \rceil$) | $\lceil \log_2(n_{RI}) \rceil$ | $\lceil \log_2(n_{RI}) \rceil$ |
| Layer Indicator (LI) | 0 | $\lceil \log_2 v \rceil$ | min(2, $\lceil \log_2 v \rceil$) | min(2, $\lceil \log_2 v \rceil$) | min(2, $\lceil \log_2 v \rceil$) |
| Wideband CQI for a First Transport Block (TB) | 4 | 4 | 4 | 4 | 4 |
| Wideband CQI for a second TB | 0 | 0 | 0 | 0 | 4 |

TABLE 3-continued

RI, LI, CQI, and CRI (of Codebook Type = Type 1, Single Panel)

| | Bitwidth | | | | |
|---|---|---|---|---|---|
| | | | | >4 Antenna Ports | |
| Field | 1 Antenna Port | 2 Antenna Ports | 4 Antenna Ports | Rank 1~4 | Rank 5~8 |
| Subband differential CQI for the first TB | 2 | 2 | 2 | 2 | 2 |
| Subband differential CQI for the second TB | 0 | 0 | 0 | 0 | 2 |
| CRI | $\lceil \log_2(K_S^{CSI-RS}) \rceil$ | $\lceil \log_2(K_S^{CSI-RS}) \rceil$ | $\lceil \log_2(K_S^{CSI-RS}) \rceil$ | $\lceil \log_2(K_S^{CSI-RS}) \rceil$ | $\lceil \log_2(K_S^{CSI-RS}) \rceil$ |

In some implementations, such as implementations in which the UE 115-a is configured with a CSI report configuration 315 including N codebook or antenna port configurations and is configured or otherwise selects to report X≤N CSIs (such as X≤N sets of CSI parameters corresponding to X≤N codebooks) in a single CSI report 320, the UE 115-a may perform a respective CSI measurement (and compute a respective set of CSI parameters) for each of the X codebooks and distribute the X≤N CSIs across a first part of the CSI report 320 and a second part of the CSI report. For example, if four codebooks are configured or indicated via the CSI report configuration 315 (such that N=4), the UE 115-a may compute four sets of CSI parameters, each set of CSI parameters corresponding to a different codebook of the four codebooks. The UE 115-a may transmit the CSI report 320 associated with (such as including at least one CSI parameter for) X codebooks, where X may be less than or equal to four (such that X≤N) and may be associated with a UE capability. For example, X may be equal to 1 for some UEs, while N may be equal to a value greater than 1 for some other UEs in accordance with respective capabilities.

In implementations in which X>1, the UE 115-a may transmit the respective CSI parameters associated with each of the X codebooks via separate transmissions (such as via separate PUCCH or PUSCH resources) or may combine the respective CSI parameters associated with each of the X codebooks via a same transmission (such as a single transmission via the CSI report 320) and transmit the CSI parameters via a same PUCCH or PUSCH resource. In implementations in which the UE 115-a transmits the respective CSI parameters associated with each of the X codebooks via a same transmission (such as via the CSI report 320), the UE 115-a and the network entity 105-a may support a CSI report structure associated with (or capable of) conveying multiple CSIs in one CSI report 320, which may, in turn, support dynamic antenna adaptation at the network entity 105-a. Additional details relating to a distribution of X≤N CSIs (such as X≤N sets of CSI parameters corresponding to X≤N codebooks) across multiple parts of the CSI report 320 in accordance with such a CSI report structure are illustrated by and described in more detail with reference to FIG. 4.

In some implementations, the UE 115-a and the network entity 105-a may support a selection mechanism or a rule associated with how the X codebooks are selected for reporting via the CSI report 320. For example, the UE 115-a and the network entity 105-a may select a value of X (such as how many codebooks to include in the CSI report 320) in accordance with a channel or link metric (such as a spectral efficiency metric). In such examples, the UE 115-a and the network entity 105-a may support a mapping or correspondence between different channel or link metric values (such as between different spectral efficiency metric values) and different values of X. Additionally, or alternatively, the UE 115-a may select a value of X in accordance with an independent UE decision. In some other implementations, the network entity 105-a may indicate a value of X to the UE 115-a. Further, the UE 115-a and the network entity 105-a may support a similar selection mechanism or rule associated with which specific X codebooks, of N configured codebooks, are selected for reporting via the CSI report 320.

Figure 4:
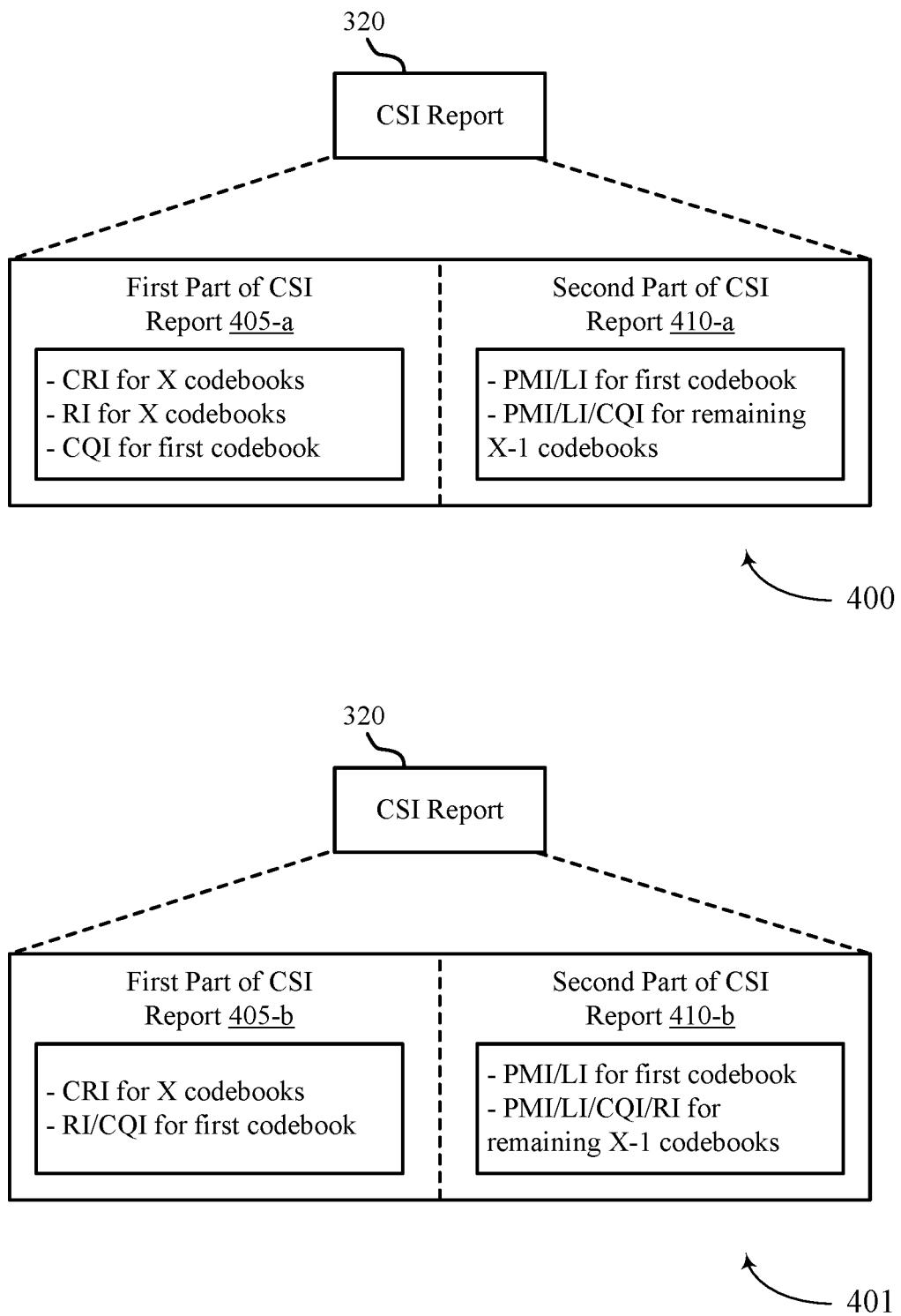
FIG. 4 shows example CSI report formats that support a CSI report structure for dynamic antenna port adaptation.

FIG. 4 shows example CSI report formats 400 and 401 that support a CSI report structure for dynamic antenna port adaptation. The CSI report formats 400 and 401 may be implemented to realize aspects of the wireless communications system 100, the network architecture 200, or the signaling diagram 300. For example, a UE 115 may transmit a CSI report 320 to a network entity 105 in accordance with the CSI report format 400 or the CSI report format 401 to provide a respective set of CSI parameters corresponding to each of multiple codebooks. The UE 115 as described with reference to FIG. 4 may be an example of a UE 115 as illustrated by and described with reference to FIGS. 1 and 2 or a UE 115-a as illustrated by and described with reference to FIG. 3. The network entity 105 as described with reference to FIG. 4 may be an example of a network entity 105 as illustrated by and described with reference to FIGS. 1 and 2 or a network entity 105-a as illustrated by and described with reference to FIG. 3. The CSI reports 320 as illustrated by and described with reference to FIG. 4 may be examples of a CSI report 320 as illustrated by and described with reference to FIG. 3.

In accordance with the CSI report format 400, the UE 115 may generate a CSI report 320 including a first part of the CSI report 405-a and a second part of the CSI report 410-a and may include, in the CSI report 320, X CSIs (such as X respective sets of CSI parameters for X codebooks) associated with a CSI report configuration (such as a CSI report configuration 315) that includes multiple codebook or antenna configurations. In some implementations, the UE 115 may include a respective CRI parameter for each of the X codebooks (such as for each of the X CSIs), a respective RI parameter for each of the X codebooks (such as for each of the X CSIs), and a CQI parameter for a first codebook (such as a specific or select codebook) of the X codebooks in the first part of the CSI report 405-a. As such, the UE 115 may include a PMI parameter and a layer indicator (LI) parameter for the first codebook (such as the specific or select codebook) of the X codebooks and a respective PMI parameter, a respective LI parameter, and a respective CQI parameter for each of the remaining X−1 codebooks (such as for each of the remaining X−1 CSIs). The remaining X−1 codebooks may include one or more codebooks and may exclude the first codebook (the specific or select codebook). Further, the UE 115 may include a respective codebook identifier (ID) in the CSI report 320 (such as in either or both of the first part of the CSI report 405-a or the second part of the CSI report 410-a) corresponding to each of the X codebooks to inform the network entity 105 of with which codebooks the reported CSI parameters are associated. In accordance with the inclusion of codebook IDs in the CSI report 320 and the CSI report format 400, the network entity 105 may identify for which codebooks the UE 115 reported CSI and which CSI parameters correspond to each respective codebook.

In accordance with the CSI report format 401, the UE 115 may generate a CSI report 320 including a first part of the CSI report 405-b and a second part of the CSI report 410-b and may include, in the CSI report 320, X CSIs (such as X respective sets of CSI parameters for X codebooks) associated with a CSI report configuration (such as a CSI report configuration 315) that includes multiple codebook or antenna configurations. In some implementations, the UE 115 may include a respective CRI parameter for each of the X codebooks (such as for each of the X CSIs) and an RI parameter and a CQI parameter for a first codebook (such as a specific or select codebook) of the X codebooks in the first part of the CSI report 405-b. As such, the UE 115 may include a PMI parameter and an LI parameter for the first codebook (such as the specific or select codebook) of the X codebooks and a respective PMI parameter, a respective LI parameter, a respective CQI parameter, and a respective RI parameter for each of the remaining X−1 codebooks (such as for each of the remaining X−1 CSIs). The remaining X−1 codebooks may include one or more codebooks and may exclude the first codebook (the specific or select codebook). Further, the UE 115 may include a respective codebook identifier (ID) in the CSI report 320 (such as in either or both of the first part of the CSI report 405-b or the second part of the CSI report 410-b) corresponding to each of the X codebooks to inform the network entity 105 of with which codebooks the reported CSI parameters are associated. In accordance with the inclusion of codebook IDs in the CSI report 320 and the CSI report format 401, the network entity 105 may identify for which codebooks the UE 115 reported CSI and which CSI parameters correspond to each respective codebook.

In some implementations, the first codebook (such as the specific or select codebook) may be a codebook of the X codebooks that is associated with a largest antenna configuration relative to a remainder of the X codebooks. For example, the first codebook may be associated with a greatest $T=N_g*N_1*N_2$ value relative to a remainder of the X codebooks. If two or more codebooks have a same value of T, the UE 115 and the network entity 105 may support an ordering or ranking associated with one or more of $N_g$, $N_1$, and $N_2$. For example, the UE 115 and the network entity 105 may support an ordering or ranking that orders codebooks by highest value of $N_g$ first, a highest value of $N_1$ second, and a highest value of $N_2$ third. Additionally, or alternatively, the first codebook may be a specifically configured or indicated codebook, a codebook associated with a specific index value (such as a lowest or highest index value), or a codebook that is indicated first in a CSI report configuration 315, among other examples.

The UE 115 and the network entity 105 may further support one or more rules or procedures according to which the UE 115 or the network entity 105 may select a resource for a transmission of the CSI report 320. In some implementations, the UE 115 and the network entity 105 may support a rule associated with conveying multiple CSIs (such as a respective set of CSI parameters for each of multiple codebooks) in a single CSI report 320 using a long PUCCH. For example, if X>1 and a PUCCH is scheduled or expected to be used for a transmission of the CSI report 320, the UE 115 and the network entity 105 may support a rule according to which a long PUCCH is exclusively used for the CSI report 320, as a size of the CSI report 320 may preclude the CSI report 320 from fitting within resources available in a short PUCCH. In such examples, the long PUCCH may be configured for periodic or semi-persistent CSI reports 320.

Additionally, or alternatively, the UE 115 and the network entity 105 may support one or more rules or procedures according to which the UE 115 may drop one or more CSI parameters from the CSI report 320. For example, if X>1 and if there is an uplink resource (such as a PUCCH or a PUSCH) is insufficient to convey all the CSI parameters of the CSI report 320, the UE 115 may drop one or more CSI parameters in accordance with a dropping rule that is mutually understood (via a stored rule or signaling) between the UE 115 and the network entity 105. The dropping rule may specify a location (such as in a first part of the CSI report or a second part of the CSI report) of where dropping is expected to begin, an order of dropping, or which specific CSIs are to be dropped first, or any combination thereof. Alternatively, the UE 115 may select which specific CSIs to drop.

In some implementations, the dropping rule may specify a dropping of a second part of a CSI report first, a partial dropping of a first part of the CSI report second, and a complete dropping of the first part of the CSI report third. In such implementations, if the first part of the CSI report is partially dropped, the UE 115 may report Y<X CSIs (such as Y<X respective (partial) sets of CSI parameters corresponding to Y<X codebooks), and which Y CSIs are reported may be left to UE decision or signaled to the UE 115. Further, a value of Y may depend on an amount or quantity of available uplink resources (such as an amount or quantity of available resource elements (REs) or resource blocks (RBs), among other example resource units). Further, if Y=1, the UE 115 may fallback to using a CSI report format associated with conveying CSI for a single codebook instead of using one of the CSI report format 400 or the CSI report format 401 (which may be designed for reporting X>1 CSIs).

In some implementations, the UE 115 may partially drop the second part of the CSI report prior to dropping the second part of the CSI report completely. In such implementations in which the UE 115 partially drops the second part of the CSI report, the UE 115 may report Z<(X−1) CSIs via the second part of the CSI report. Which Z CSIs the UE 115 reports may be left to UE decision or may be signaled to the UE 115 and a value of Z may depend on an amount or quantity of available uplink resources (such as an amount or quantity of available REs or RBs, among other example resource units).

Figure 5:
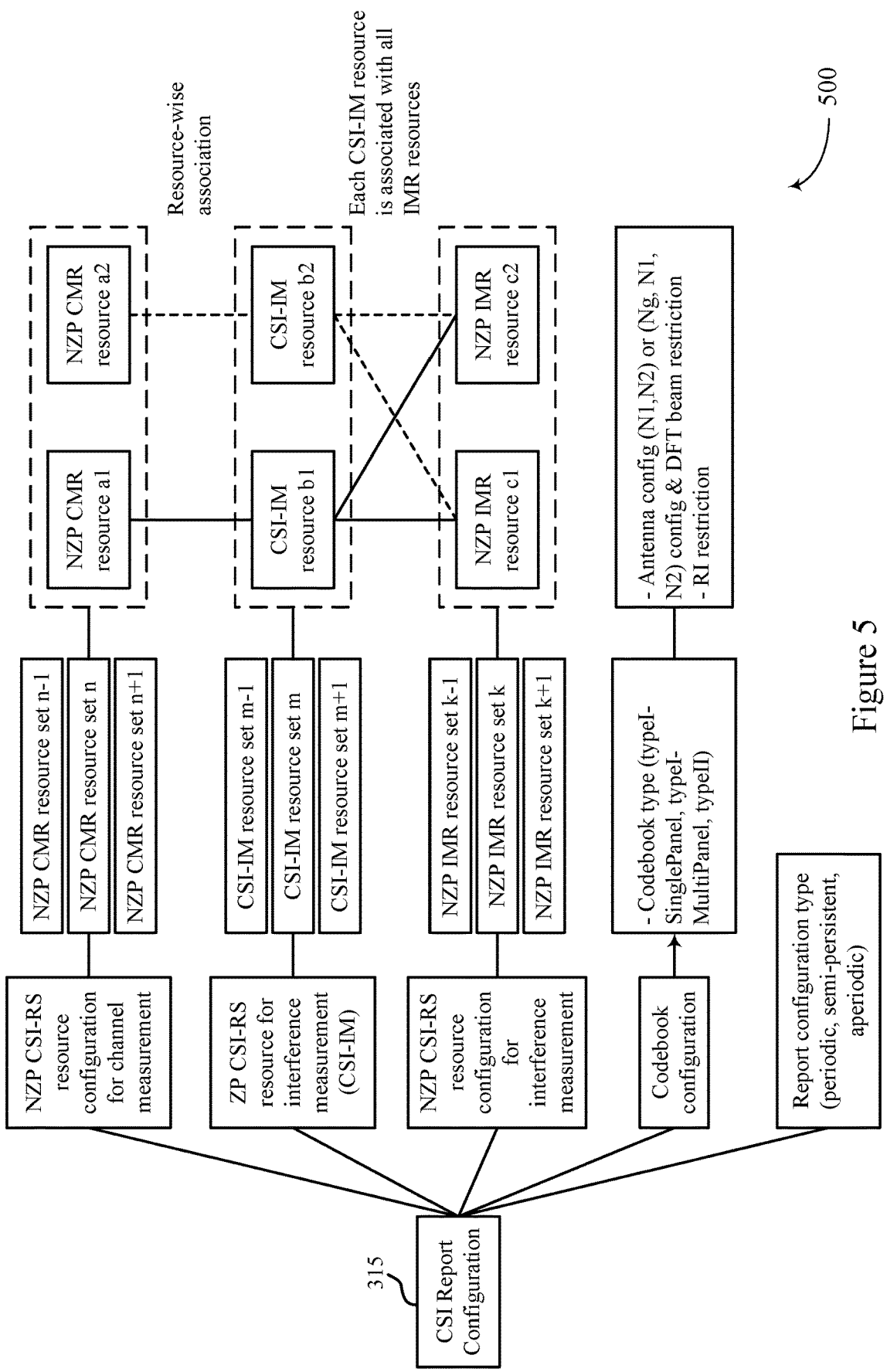
FIG. 5 shows an example CSI configuration that supports a CSI report structure for dynamic antenna port adaptation.

FIG. 5 shows an example CSI configuration 500 that supports a CSI report structure for dynamic antenna port adaptation. The CSI configuration 500 may be implemented to realize aspects of the wireless communications system 100, the network architecture 200, the signaling diagram 300, or the CSI report format 400 or 401. For example, a network entity 105 may transmit a control message to a UE 115. The control message may include or reference a CSI report configuration 315 that indicates the CSI configuration 500.

The UE 115 as described with reference to FIG. 5 may be an example of a UE 115 as illustrated by or described with reference to FIGS. 1, 2, and 4 or a UE 115-a as illustrated by and described with reference to FIG. 3. The network entity 105 as described with reference to FIG. 5 may be an example of a network entity 105 as illustrated by or described with reference to FIG. 1, 2, or 4 or a network entity 105-a as illustrated by and described with reference to FIG. 3. The CSI report configuration 315 as illustrated by and described with reference to FIG. 5 may be examples of a CSI report configuration 315 as illustrated by and described with reference to FIG. 3.

For example, the UE 115 may receive the control message including a CSI report configuration 315 (which may be equivalently referred to as a CSI report config or a CSI reporting setting) that may link to one or more resource settings associated with different measurement types. For example, the CSI report configuration 315 may link to one or more of a non-zero power (NZP) CSI-RS resource for channel measurement (CMR), a CSI-RS resource for interference measurement (CSI-IM), or an NZP CSI-RS for interference measurement (NZP-IMR), or any combination thereof. Each resource setting of the one or more resource settings to which the CSI report configuration may link may be associated with multiple resources sets, but one active resource set (such as only one active resource set).

For example, the NZP-CMR resource setting may be associated with an NZP-CMR resource set n−1, an NZP-CMR resource set n, and an NZP-CMR resource set n+1, and the NZP-CMR resource set n may be the active resource set. Similarly, the CSI-IM resource setting may be associated with an CSI-IM resource set m−1, an CSI-IM resource set m, and an CSI-IM resource set m+1, and the CSI-IM resource set m may be the active resource set. Similarly, the NZP-IMR resource setting may be associated with an NZP-IMR resource set s−1, an NZP-IMR resource set s, and an NZP-IMR resource set s+1, and the NZP-IMR resource set s may be the active resource set.

Further, each resource set may include one or more resources. For example, the NZP-CMR resource set n may include N resources including an NZP-CMR resource a1 and an NZP-CMR resource a2. Similarly, the CSI-IM resource set m may include M resources including a CSI-IM resource b1 and a CSI-IM resource b2. Similarly, the NZP-IMR resource set s may include S resources including an NZP-IMR resource b1 and an NZP-IMR resource b2. On CSI-IM resources, other signals designated to the UE 115 may be muted so that the UE 115 may measure interference directly. Further, NZP CSI-RS may be used primarily for channel measurement, but also may be used for interference measurement (and, as such, may be referred to as an NZP CSI-RS for interference measurement), where a channel estimated using the CSI-RS may be included in the assumed or measured interference.

In some implementations, the UE 115 may select one NZP-CMR resource out of the N NZP-CMR resources to use for reporting CSI. In such examples, the UE 115 may report the selected CMR resource in a CRI field as part of the CSI feedback so that a receiving network entity 105 knows to which NZP-CMR resource the reported CSI corresponds. In accordance with the selected NZP-CMR resource, the UE 115 also may implicitly select a resource from the M resources including a CSI-IM resource b1 and a CSI-IM resource b2 and one or more resources from the S resources including an NZP-IMR resource c1 and an NZP-IMR resource c2. For example, an NZP-CMR resource may feature a resource-wise association with a CSI-IM resource, such that one NZP-CMR resources is associated with one CSI-IM resource. For instance, the NZP-CMR resource a1 may be associated with the CSI-IM resource b1 and the NZP-CMR resource a2 may be associated with the CSI-IM resource b2. Additionally, each NZP-CMR resource may be associated with all NZP-IMR resources collectively, such that the NZP-CMR resource a1 and the NZP-CMR resource a2 may both be associated with the NZP-IMR resource c1 and the NZP-IMR resource c2.

Additionally, in some implementations, the CSI report configuration 315 may indicate a codebook configuration, which may correspond to a specific codebook type. For example, the codebook configuration may correspond to typeI-SinglePanel, typeI-MultiPanel, or typeII. The codebook configuration may further indicate or correspond to an antenna configuration (such as an $(N_1, N_2)$ configuration or an $(NgN_1, N_2)$ configuration), a DFT beam restriction (such as an $(O_1, O_2)$ configuration), and an RI restriction. The CSI report configuration 315 may further indicate a report configuration type, such as periodic, semi-persistent, or aperiodic). In some aspects, the CSI report configuration 315 may be RRC configured per BWP and a given resource set may have $K_s$ resources with a same quantity of CSI-RS ports. For example, if $K_s=1$, each resource may include at most 32 CSI-RS ports; if $K_s=2$, each resource may include at most 16 CSI-RS ports; or if $2<K_s\leq8$, each resource may include at most 8 CSI-RS ports. Further, a P-port resource may include ports labeled from 3000 to 300(P−1).

Figure 6:
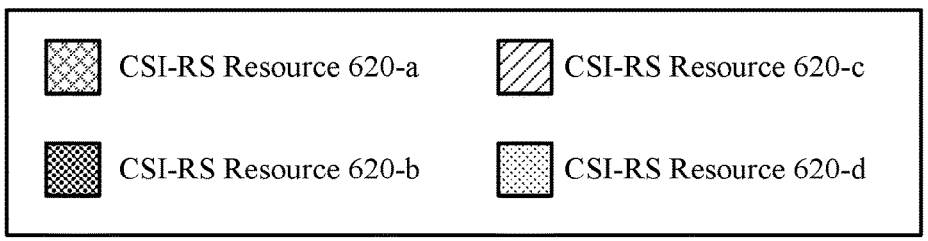
FIG. 6 shows an example resource modification diagram that supports a CSI report structure for dynamic antenna port adaptation.
Figure 6:
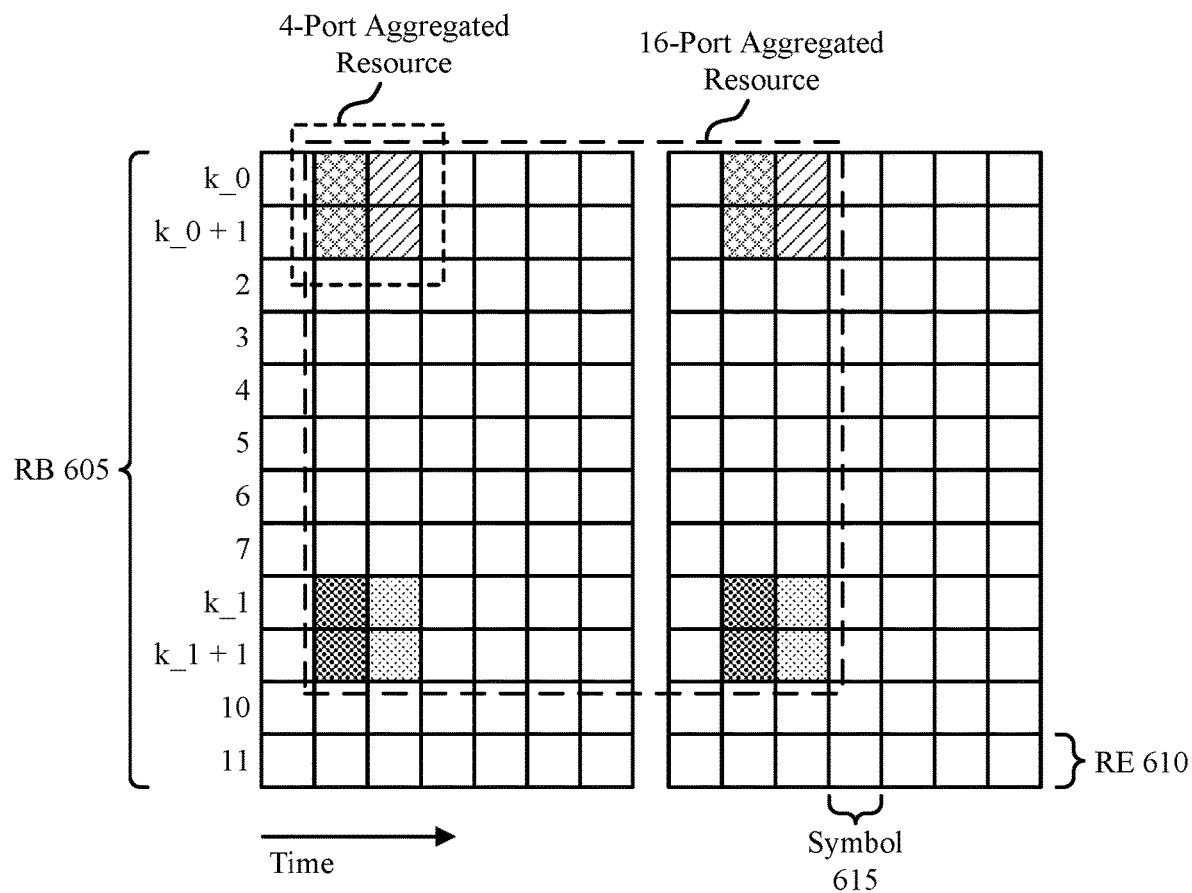

FIG. 6 shows an example resource modification diagram 600 that supports a CSI report structure for dynamic antenna port adaptation. The resource modification diagram 600 may be implemented to realize aspects of the wireless communications system 100, the network architecture 200, the signaling diagram 300, the CSI report format 400 or 401, or the CSI configuration 500. For example, the resource modification diagram 600 illustrates aggregation or reduction of resources from a resource set configured or indicated in a CSI report configuration 315 with multiple codebook or antenna configurations. As such, a UE 115 or a network entity 105, or both, may perform or expect resource aggregation or reduction to form a new resource with a larger quantity of CSI-RS ports.

The UE 115 as described with reference to FIG. 6 may be an example of a UE 115 as illustrated by or described with reference to FIGS. 1, 2, 4, and 5 or a UE 115-a as illustrated by and described with reference to FIG. 3. The network entity 105 as described with reference to FIG. 6 may be an example of a network entity 105 as illustrated by or described with reference to FIGS. 1, 2, 4, and 5 or a network entity 105-a as illustrated by and described with reference to FIG. 3. The CSI report configuration 315 as described with reference to FIG. 6 may be examples of a CSI report configuration 315 as illustrated by and described with reference to FIG. 3.

As illustrated by the resource modification diagram 600, the UE 115 may monitor for one or more CSI-RSs at specific resources within an RB 605, which may include a quantity of REs 610 across a quantity of symbols 615 and may aggregate specific resources to create a new, larger resource associated with a greater quantity of CSI-RS ports. In some aspects, the specific resources may include a CSI-RS resource 620-a, a CSI-RS resource 620-b, a CSI-RS resource 620-c, and a CSI-RS resource 620-d.

For example, a resource set may have 4 resources including 8 CSI-RS ports and, as illustrated by the 16-port aggregated resource, the resources may be aggregated to form a new resource including 16, 24, or 32 CSI-RS ports. Such an aggregation of resources into the 16-port aggregated resource may be associated with a CSI report configuration 315 that indicates a resource setting that includes four 8-port CSI-RS resources in a resource set and that indicates codebook configurations of $(N_1, N_2)=(4,4)$, $(N_1, N_2)=(2,1)$, $(N_1, N_2)=(2,2)$, and $(N_1, N_2)=(4,2)$, each associated with a respective beam and RI restriction.

In addition, a resource may be formed as a subset of a resource in a resource set, which may be referred to as resource reduction. For example, and as illustrated by the 4-port aggregated resource, a resource including 4 CSI-RS ports may be a subset of a resource including 8 CSI-RS ports. Such a reduction to the 4-port aggregated resource may be associated with a CSI report configuration 315 that indicates a resource setting of four 8-port CSI-RS resources in a resource set and that indicates codebook configurations of $(N_1, N_2)=(2,2)$ and $(N_1, N_2)=(2,1)$, each associated with a respective beam and RI restriction.

Figure 7:
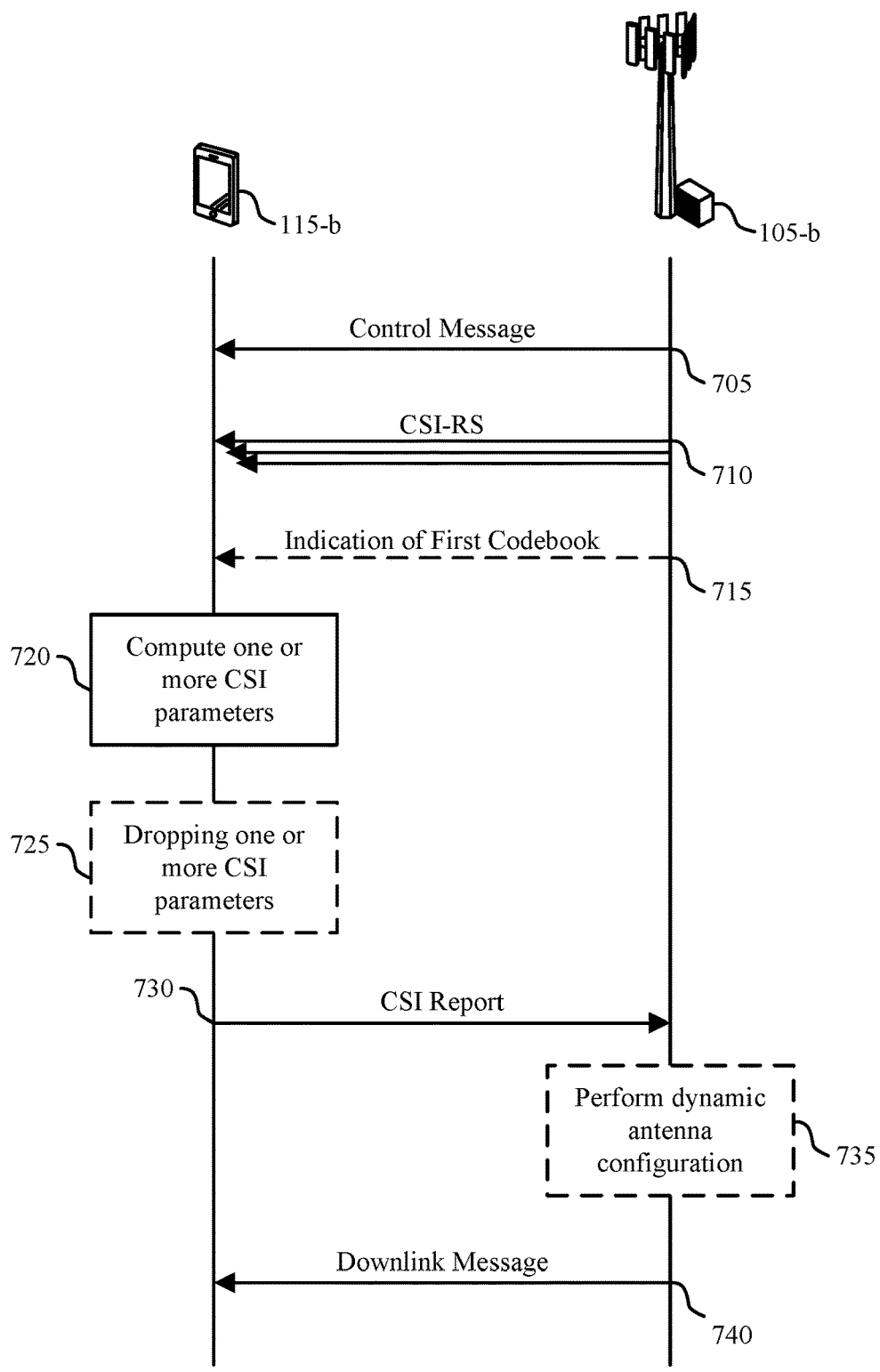
FIG. 7 shows an example process flow that supports a CSI report structure for dynamic antenna port adaptation.

FIG. 7 shows an example process flow 700 that supports a CSI report structure for dynamic antenna port adaptation. The process flow 700 may implement or be implemented to realize aspects of the wireless communications system 100, the network architecture 200, the signaling diagram 300, the CSI report format 400 or 401, the CSI configuration 500, or the resource modification diagram 600. For example, the process flow 700 may illustrate communication between a UE 115-b and a network entity 105-b. The UE 115-b may be an example of a UE 115 or a UE 115-a as illustrated by or described with reference to FIGS. 1-6. The network entity 105-b may be an example of a network entity 105 or a network entity 105-a as illustrated by and described with reference to FIGS. 1-6. In some implementations, the UE 115-b and the network entity 105-b may support a CSI report structure according to which the UE 115-b may transmit respective sets of CSI parameters for each of multiple codebooks via one CSI report (such as a CSI report 320 as illustrated by and described with reference to FIG. 3).

In the following description of the process flow 700, the operations may be performed (such as reported or provided) in a different order than the order shown, or the operations performed by the example devices may be performed in different orders or at different times. For example, specific operations also may be left out of the process flow 700, or other operations may be added to the process flow 700. Further, although some operations or signaling may be shown to occur at different times for discussion purposes, these operations may actually occur at the same time.

At 705, the UE 115-b may receive, from the network entity 105-b via a control message (such as an RRC message), an indication of a CSI report configuration including a set of codebook parameters associated with multiple codebooks. In some aspects, the multiple codebooks may be associated with multiple CSI measurements at the UE 115-b. In some aspects, the multiple codebooks may include a quantity of N codebooks.

At 710, the UE 115-b may receive, from the network entity 105-b and in accordance with the CSI report configuration (such as in accordance with the set of codebook parameters associated with the multiple codebooks), a set of one or more CSI-RSs. In some aspects, the UE 115-b may receive the set of one or more CSI-RSs in accordance with measuring or monitoring at specific resources indicated by the CSI report configuration.

At 715, the UE 115-b may, in some implementations, receive an indication of a first codebook (such as a specific or select codebook) from the network entity 105-b. In such implementations, the UE 115-b may receive the indication of the first codebook via a first codebook index and via one or more of RRC signaling, a MAC control element (MAC-CE), or downlink control information (DCI). In some other implementations, the UE 115-b may select the first codebook as a codebook that corresponds to (or is associated with) an antenna port configuration associated with a relatively greatest quantity of antenna ports per resource relative to a remainder of codebooks for which the UE 115-b may report CSI. For example, the UE 115-b may select the first codebook as the codebook associated with a greatest value of $T=N_g*N_1*N_2$.

At 720, the UE 115-b may compute one or more CSI parameters associated with the set of one or more CSI-RSs in accordance with the set of codebook parameters. For example, the UE 115-b may perform a CSI calculation according to which the UE 115-b obtains one or more CSI parameters (including, for example, an RI parameter, a PMI parameter, and a CQI parameter) for each of the codebooks for which the UE 115-b may report CSI. In some implementations, the UE 115-b may obtain a downlink channel estimation $(H)_{M_T M_t}$, where $M_r \times M_t$ define a downlink channel matrix H. The UE 115-b may calculate a precoding and rank selection for a given codebook in accordance with Equation 1, shown below, and in light of a codebook from rank-1 to rank-R being given by $(\{P_1(0), \ldots, P_1(L_1-1)\}, \ldots, \{P_R(0), \ldots, P_R(L_R-1)\})$.

$$(R^*, i^*) = \mathrm{argmax}_{r,i} SE_{est}(H, P_r(i)) \quad (1)$$

As shown in Equation 1, $SE_{est}(H, P_r(i))$ may denote a spectral efficiency estimation where H and $P_r(i)$ are given or known, R* may denote a rank (such as an optimal or sufficient rank), and $P_r(i)$ may denote a precoder (such as an optimal or sufficient precoder). The UE 115-b may further perform a CQI calculation in accordance with Equation 2, shown below. As shown in Equation 2, a CQI parameter may be conditioned on the rank and precoder.

$$CQI^* = f(SE_{est}(H, P_r(i))) \quad (2)$$

At 725, the UE 115-b may, in some implementations, drop one or more CSI parameters from one or both of a first part of a CSI report or a second part of a CSI report. The UE 115-b may drop one or more CSI parameters in scenarios in which an uplink resource allocated for a CSI report is insufficient to carry the full CSI report. In some implementations, the UE 115-b and the network entity 105-b may support one or more mutually understood dropping rules, as described in more detail with reference to FIG. 4.

At 730, the UE 115-b may transmit, to the network entity 105-b, a CSI report including a respective set of CSI parameters for each of at least a subset of codebooks (of the multiple codebooks indicated by the CSI report configuration) in accordance with the CSI computation at the UE 115-b. In some implementations, the UE 115-b may transmit the CSI report in multiple parts, including a first part and a second part. In such implementations, the UE 115-b may transmit a CQI parameter for the first codebook via the first part of the CSI report and may transmit a respective CQI parameter for each of a remainder of the subset of codebooks via the second part of the CSI report. In some implementations, the UE 115-b may select the first codebook and may indicate the corresponding codebook (the selected first codebook) to the network entity 105-*b* via the first part of the CSI report. Additional details relating to the formatting and distribution of CSI parameters across the first part of the CSI report and the second part of the CSI report are illustrated by and described with reference to FIG. 4.

At 735, the network entity 105-*b* may, in some implementations, perform a dynamic antenna configuration in accordance with the respective set of CSI parameters received for each of the subset of codebooks. For example, the network entity 105-*b* may use the CSI obtained from the UE 115-*b* to inform the network entity 105-*b* as to which antenna panel configurations may balance energy savings at the network entity 105-*b* while maintaining link connectivity and sufficient channel conditions between the UE 115-*b* and the network entity 105-*b*.

At 740, the network entity 105-*b* may transmit a downlink message to the UE 115-*b*. For example, the network entity 105-*b* may perform UE scheduling and rank, precoding matrix, and modulation and coding scheme (MCS) determination in accordance with the CSI obtained from the UE 115-*b*. In some implementations, the network entity 105-*b* may transmit the downlink message, which may be a physical downlink control channel (PDCCH) or a physical downlink shared channel (PDSCH) transmission, using an updated antenna configuration.

Figure 8:
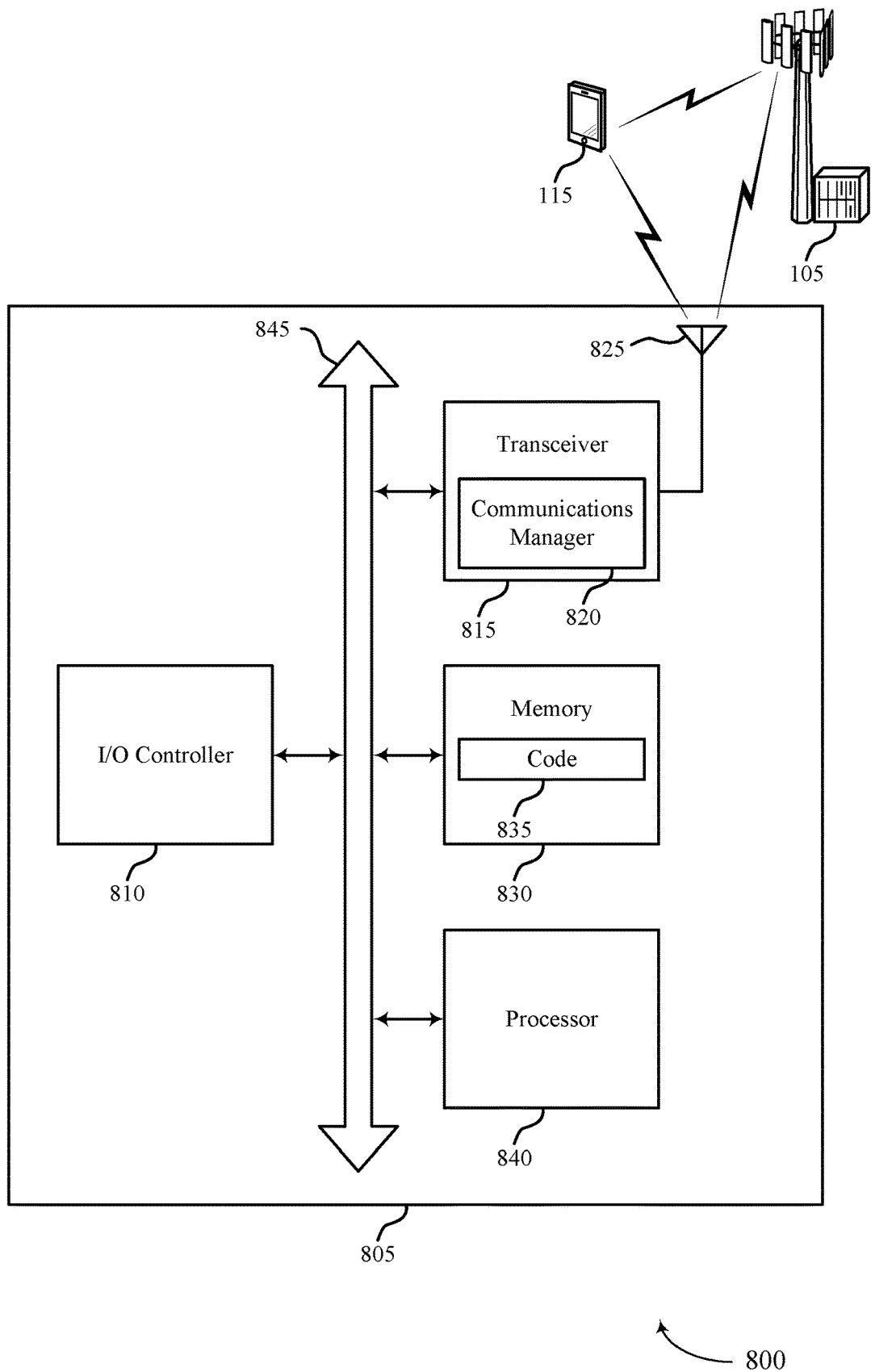
FIGS. 8 and 9 show block diagrams of example devices that support a CSI report structure for dynamic antenna port adaptation.

FIG. 8 shows a block diagram 800 of an example device 805 that supports a CSI report structure for dynamic antenna port adaptation. The device 805 may communicate (such as wirelessly) with one or more network entities (such as one or more components of one or more network entities 105), one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (such as operatively, communicatively, functionally, electronically, electrically) via one or more buses (such as a bus 845).

The I/O controller 810 may manage input and output signals for the device 805. The I/O controller 810 also may manage peripherals not integrated into the device 805. In some implementations, the I/O controller 810 may represent a physical connection or port to an external peripheral. In some implementations, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some implementations, the I/O controller 810 may be implemented as part of a processor or processing system, such as the processor 840. In some implementations, a user may interact with the device 805 via the I/O controller 810 or via hardware components controlled by the I/O controller 810.

In some implementations, the device 805 may include a single antenna 825. However, in some other implementations, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 also may include a modem to modulate the packets, to provide the modulated packets to one or more antennas 825 for transmission, and to demodulate packets received from the one or more antennas 825. In some implementations, the transceiver 815 may include one or more interfaces, such as one or more interfaces coupled with the one or more antennas 825 that are configured to support various receiving or obtaining operations, or one or more interfaces coupled with the one or more antennas 825 that are configured to support various transmitting or outputting operations, or a combination thereof. In some implementations, the transceiver 815 may include or be configured for coupling with one or more processors or memory components that are operable to perform or support operations in accordance with received or obtained information or signals, or to generate information or other signals for transmission or other outputting, or any combination thereof. In some implementations, the transceiver 815, or the transceiver 815 and the one or more antennas 825, or the transceiver 815 and the one or more antennas 825 and one or more processors or memory components (such as the processor 840, or the memory 830, or both), may be included in a chip or chip assembly that is installed in the device 805.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some implementations, the code 835 may not be directly executable by the processor 840 but may cause a computer (such as when compiled and executed) to perform functions described herein. In some implementations, the memory 830 may contain, among other things, a basic I/O system (BIOS) which may control basic hardware or software operation such as the interaction with peripheral components or devices.

The processor 840 may be any one or more suitable processors capable of executing scripts or instructions of one or more software programs stored in the device 805 (such as within the memory 830). In some implementations, the processor 840 may be a component of a processing system. A processing system may generally refer to a system or series of machines or components that receives inputs and processes the inputs to produce a set of outputs (which may be passed to other systems or components of, for example, the device 805). For example, a processing system of the device 805 may refer to a system including the various other components or subcomponents of the device 805, such as the processor 840, or the transceiver 815, or the communications manager 820, or other components or combinations of components of the device 805. The processing system of the device 805 may interface with other components of the device 805, and may process information received from other components (such as inputs or signals) or output information to other components. For example, a chip or modem of the device 805 may include a processing system and an interface to output information, or to obtain information, or both. The interface may be implemented as or otherwise include a first interface configured to output information and a second interface configured to obtain information. In some implementations, the first interface may refer to an interface between the processing system of the chip or modem and a transmitter, such that the device 805 may transmit information output from the chip or modem. In some implementations, the second interface may refer to an interface between the processing system of the chip or modem and a receiver, such that the device 805 may obtain information or signal inputs, and the information may be passed to the processing system. A person having ordinary skill in the art will readily recognize that the first interface also may obtain information or signal inputs, and the second interface also may output information or signal outputs.

The communications manager 820 may support wireless communication at a UE in accordance with examples as disclosed herein. For example, the communications manager 820 may be configured as or otherwise support a means for receiving, via a control message, an indication of a CSI report configuration including a set of codebook parameters associated with a set of multiple codebooks, the set of multiple codebooks associated with multiple CSI measurements at the UE. The communications manager 820 may be configured as or otherwise support a means for transmitting, via a CSI report, a set of CSI parameters for each of a subset of codebooks of the set of multiple codebooks.

In some implementations, to support transmitting the set of CSI parameters for each of the subset of codebooks, the communications manager 820 may be configured as or otherwise support a means for transmitting, via a first part of the CSI report, a CQI parameter for a first codebook of the subset of codebooks. In some implementations, to support transmitting the set of CSI parameters for each of the subset of codebooks, the communications manager 820 may be configured as or otherwise support a means for transmitting, via a second part of the CSI report, a CQI parameter for each of a remainder of the subset of codebooks.

In some implementations, transmitting the first part of the CSI report further includes transmitting a CRI and an RI for each of the subset of codebooks. In some implementations, transmitting the second part of the CSI report further includes transmitting a PMI and an LI for each of the subset of codebooks.

In some implementations, transmitting the first part of the CSI report further includes transmitting a CRI for each of the subset of codebooks and an RI for the first codebook. In some implementations, transmitting the second part of the CSI report further includes transmitting a PMI and an LI for each of the subset of codebooks and an RI for each of the remainder of the subset of codebooks.

In some implementations, the communications manager 820 may be configured as or otherwise support a means for receiving an indication of the first codebook, where including the CQI parameter for the first codebook in the first part of the CSI report and including the CQI parameter for each of the remainder of the subset of codebooks in the second part of the CSI report are associated with receiving the indication of the first codebook.

In some implementations, each codebook of the subset of codebooks corresponds to a different antenna port configuration. In some implementations, the first codebook corresponds to an antenna port configuration associated with a relatively greatest quantity of antenna ports per resource relative to a remainder of the subset of codebooks.

In some implementations, to support transmitting the first part of the CSI report, the communications manager 820 may be configured as or otherwise support a means for transmitting an indication of the first codebook, where including the CQI parameter for the first codebook in the first part of the CSI report and including the CQI parameter for each of the remainder of the subset of codebooks in the second part of the CSI report are associated with transmitting the indication of the first codebook.

In some implementations, the communications manager 820 may be configured as or otherwise support a means for selecting the first codebook from the subset of codebooks, where transmitting the indication of the first codebook via the first part of the CSI report is associated with selecting the first codebook from the subset of codebooks.

In some implementations, the communications manager 820 may be configured as or otherwise support a means for receiving an indication of an uplink resource for the CSI report, where transmitting the CSI report using the uplink resource includes a dropping of one or more CSI parameters from one or both of a first part of the CSI report or a second part of the CSI report, and where the dropping is associated with a size of the uplink resource and a quantity of the subset of codebooks.

In some implementations, the communications manager 820 may be configured as or otherwise support a means for receiving an indication of a first quantity of CSI parameters to maintain in the first part of the CSI report if a portion of the first part of the CSI report is to be dropped. In some implementations, the communications manager 820 may be configured as or otherwise support a means for receiving an indication of a second quantity of CSI parameters to maintain in the second part of the CSI report if a portion of the second part of the CSI report is to be dropped.

In some implementations, the dropping is associated with an ordered dropping of a portion of the second part of the CSI report first, an entirety of the second part of the CSI report second, a portion of the first part of the CSI report third, and an entirety of the first part of the CSI report fourth until the CSI report fits within the size of the uplink resource.

In some implementations, to support transmitting the CSI report, the communications manager 820 may be configured as or otherwise support a means for transmitting the CSI report using a long PUCCH in accordance with the CSI report including the set of CSI parameters for each of the subset of codebooks.

In some implementations, the set of codebook parameters associated with the set of multiple codebooks includes an antenna port configuration, a precoder restriction, and a rank restriction for each of the set of multiple codebooks.

In some implementations, the communications manager 820 may be configured as or otherwise support a means for computing the set of CSI parameters for each of the subset of codebooks in accordance with a set of one or more CSI-RSs and in accordance with the set of codebook parameters.

In some implementations, the communications manager 820 may be configured to perform various operations (such as receiving, monitoring, transmitting) using or otherwise in cooperation with the transceiver 815, the one or more antennas 825, or any combination thereof. Although the communications manager 820 is illustrated as a separate component, in some implementations, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of a CSI report structure for dynamic antenna port adaptation as described herein, or the processor 840 and the memory 830 may be otherwise configured to perform or support such operations.

Figure 9:
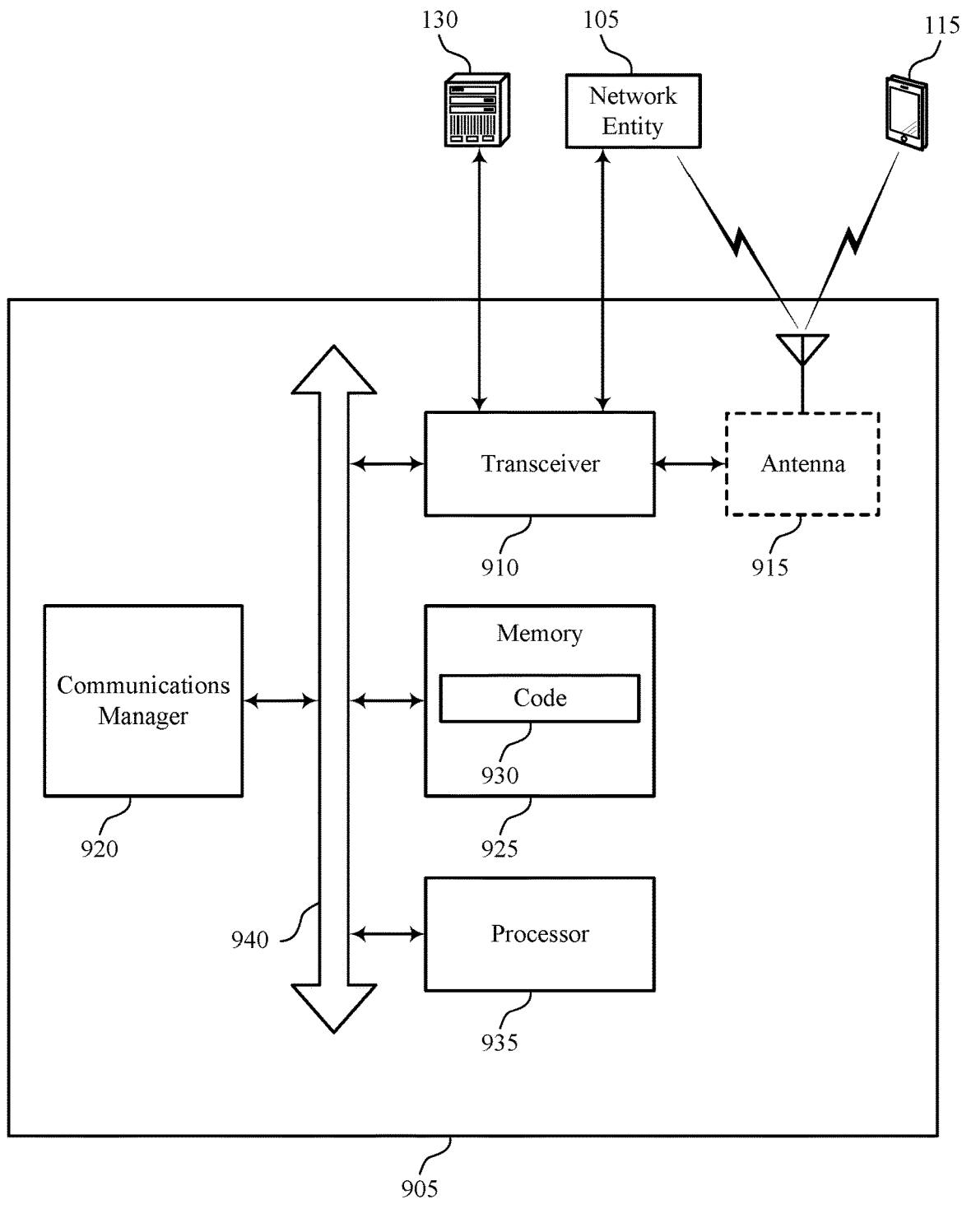

FIG. 9 shows a block diagram 900 of an example device 905 that supports a CSI report structure for dynamic antenna port adaptation. The device 905 may communicate with one or more network entities (such as one or more components of one or more network entities 105), one or more UEs 115, or any combination thereof, which may include communications over one or more wired interfaces, over one or more wireless interfaces, or any combination thereof. The device 905 may include components that support outputting and obtaining communications, such as a communications manager 920, a transceiver 910, an antenna 915, a memory 925, code 930, and a processor 935. These components may be in electronic communication or otherwise coupled (such as operatively, communicatively, functionally, electronically, electrically) via one or more buses (such as a bus 940).

The transceiver 910 may support bi-directional communications via wired links, wireless links, or both as described herein. In some implementations, the transceiver 910 may include a wired transceiver and may communicate bi-directionally with another wired transceiver. Additionally, or alternatively, in some implementations, the transceiver 910 may include a wireless transceiver and may communicate bi-directionally with another wireless transceiver. In some implementations, the device 905 may include one or more antennas 915, which may be capable of transmitting or receiving wireless transmissions (such as concurrently). The transceiver 910 also may include a modem to modulate signals, to provide the modulated signals for transmission (such as by one or more antennas 915, by a wired transmitter), to receive modulated signals (such as from one or more antennas 915, from a wired receiver), and to demodulate signals. In some implementations, the transceiver may be operable to support communications via one or more communications links (such as a communication link 125, a backhaul communication link 120, a midhaul communication link 162, a fronthaul communication link 168).

The memory 925 may include RAM and ROM. The memory 925 may store computer-readable, computer-executable code 930 including instructions that, when executed by the processor 935, cause the device 905 to perform various functions described herein. The code 930 may be stored in a non-transitory computer-readable medium such as system memory or another type of memory. In some implementations, the code 930 may not be directly executable by the processor 935 but may cause a computer (such as when compiled and executed) to perform functions described herein. In some implementations, the memory 925 may contain, among other things, a BIOS which may control basic hardware or software operation such as the interaction with peripheral components or devices.

The processor 935 may include an intelligent hardware device (such as a general-purpose processor, a DSP, an ASIC, a CPU, an FPGA, a microcontroller, a programmable logic device, discrete gate or transistor logic, a discrete hardware component, or any combination thereof). In some implementations, the processor 935 may be configured to operate a memory array using a memory controller. In some other implementations, a memory controller may be integrated into the processor 935. The processor 935 may be configured to execute computer-readable instructions stored in a memory (such as the memory 925) to cause the device 905 to perform various functions (such as functions or tasks supporting CSI report structure for dynamic antenna port adaptation). For example, the device 905 or a component of the device 905 may include a processor 935 and memory 925 coupled with the processor 935, the processor 935 and memory 925 configured to perform various functions described herein. The processor 935 may be an example of a cloud-computing platform (such as one or more physical nodes and supporting software such as operating systems, virtual machines, or container instances) that may host the functions (such as by executing code 930) to perform the functions of the device 905.

In some implementations, a bus 940 may support communications of (such as within) a protocol layer of a protocol stack. In some implementations, a bus 940 may support communications associated with a logical channel of a protocol stack (such as between protocol layers of a protocol stack), which may include communications performed within a component of the device 905, or between different components of the device 905 that may be co-located or located in different locations (such as where the device 905 may refer to a system in which one or more of the communications manager 920, the transceiver 910, the memory 925, the code 930, and the processor 935 may be located in one of the different components or divided between different components).

In some implementations, the communications manager 920 may manage aspects of communications with a core network 130 (such as via one or more wired or wireless backhaul links). For example, the communications manager 920 may manage the transfer of data communications for client devices, such as one or more UEs 115. In some implementations, the communications manager 920 may manage communications with other network entities 105, and may include a controller or scheduler for controlling communications with UEs 115 in cooperation with other network entities 105. In some implementations, the communications manager 920 may support an X2 interface within an LTE/LTE-A wireless communications network technology to provide communication between network entities 105.

The communications manager 920 may support wireless communication at a network entity in accordance with examples as disclosed herein. For example, the communications manager 920 may be configured as or otherwise support a means for transmitting, via a control message, an indication of a CSI report configuration including a set of codebook parameters associated with a set of multiple codebooks, the set of multiple codebooks associated with multiple CSI measurements at a UE. The communications manager 920 may be configured as or otherwise support a means for receiving, via a CSI report, a set of CSI parameters for each of a subset of codebooks of the set of multiple codebooks.

In some implementations, to support receiving the set of CSI parameters for each of the subset of codebooks, the communications manager 920 may be configured as or otherwise support a means for receiving, via a first part of the CSI report, a CQI parameter for a first codebook of the subset of codebooks. In some implementations, to support receiving the set of CSI parameters for each of the subset of codebooks, the communications manager 920 may be configured as or otherwise support a means for receiving, via a second part of the CSI report, a CQI parameter for each of a remainder of the subset of codebooks.

In some implementations, receiving the first part of the CSI report further includes receiving a CRI and an RI for each of the subset of codebooks. In some implementations, receiving the second part of the CSI report further includes receiving a PMI and an LI for each of the subset of codebooks.

In some implementations, receiving the first part of the CSI report further includes receiving a CRI for each of the subset of codebooks and an RI for the first codebook. In some implementations, receiving the second part of the CSI report further includes receiving a PMI and an LI for each of the subset of codebooks and an RI for each of the remainder of the subset of codebooks.

In some implementations, the communications manager 920 may be configured as or otherwise support a means for transmitting an indication of the first codebook, where receiving the CQI parameter for the first codebook in the first part of the CSI report and receiving the CQI parameter for each of the remainder of the subset of codebooks is associated with transmitting the indication of the first codebook.

In some implementations, each codebook of the subset of codebooks corresponds to a different antenna port configuration. In some implementations, the first codebook corresponds to an antenna port configuration associated with a relatively greatest quantity of antenna ports per resource relative to a remainder of the subset of codebooks.

In some implementations, to support receiving the first part of the CSI report, the communications manager 920 may be configured as or otherwise support a means for receiving an indication of the first codebook, where receiving the CQI parameter for the first codebook in the first part of the CSI report and receiving the CQI parameter for each of the remainder of the subset of codebooks in the second part of the CSI report are associated with receiving the indication of the first codebook.

In some implementations, the communications manager 920 may be configured as or otherwise support a means for transmitting an indication of an uplink resource for the CSI report, where receiving the CSI report using the uplink resource is associated with a dropping of one or more CSI parameters from one or both of a first part of the CSI report or a second part of the CSI report, and where the dropping is associated with a size of the uplink resource and a quantity of the subset of codebooks.

In some implementations, the communications manager 920 may be configured as or otherwise support a means for transmitting an indication of a first quantity of CSI parameters to maintain in the first part of the CSI report if a portion of the first part of the CSI report is to be dropped. In some implementations, the communications manager 920 may be configured as or otherwise support a means for transmitting an indication of a second quantity of CSI parameters to maintain in the second part of the CSI report if a portion of the second part of the CSI report is to be dropped.

In some implementations, the dropping is associated with an ordered dropping of a portion of the second part of the CSI report first, an entirety of the second part of the CSI report second, a portion of the first part of the CSI report third, and an entirety of the first part of the CSI report fourth until the CSI report fits within the size of the uplink resource.

In some implementations, to support receiving the CSI report, the communications manager 920 may be configured as or otherwise support a means for receiving the CSI report using a long PUCCH in accordance with the CSI report including the set of CSI parameters for each of the subset of codebooks.

In some implementations, the set of codebook parameters associated with the set of multiple codebooks includes an antenna port configuration, a precoder restriction, and a rank restriction for each of the set of multiple codebooks.

In some implementations, the communications manager 920 may be configured to perform various operations (such as receiving, obtaining, monitoring, outputting, transmitting) using or otherwise in cooperation with the transceiver 910, the one or more antennas 915 (such as where applicable), or any combination thereof. Although the communications manager 920 is illustrated as a separate component, in some implementations, one or more functions described with reference to the communications manager 920 may be supported by or performed by the processor 935, the memory 925, the code 930, the transceiver 910, or any combination thereof. For example, the code 930 may include instructions executable by the processor 935 to cause the device 905 to perform various aspects of CSI report structure for dynamic antenna port adaptation as described herein, or the processor 935 and the memory 925 may be otherwise configured to perform or support such operations.

Figure 10:
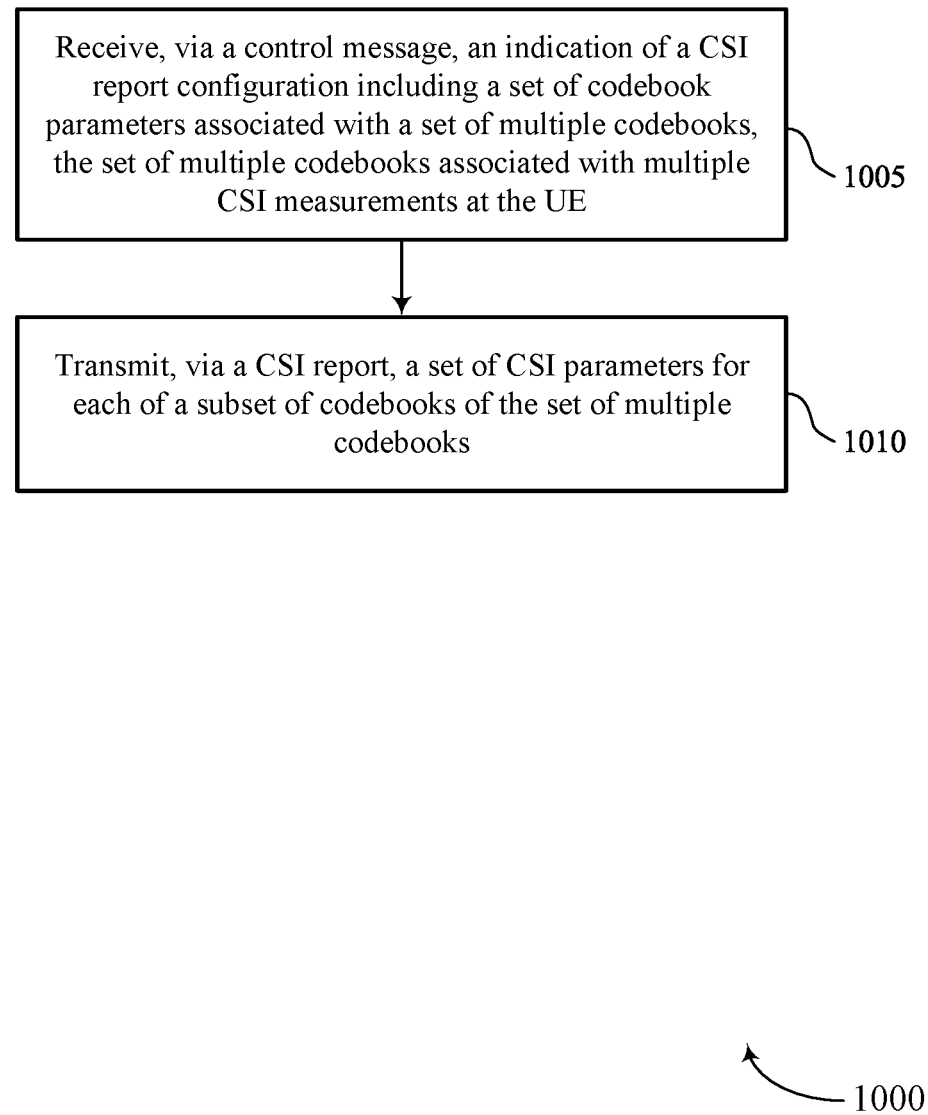
FIGS. 10 and 11 show flowcharts illustrating example methods that support a CSI report structure for dynamic antenna port adaptation.

FIG. 10 shows a flowchart illustrating an example method 1000 that supports a CSI report structure for dynamic antenna port adaptation. The operations of the method 1000 may be implemented by a UE or its components as described herein. For example, the operations of the method 1000 may be performed by a UE 115 as described with reference to FIGS. 1-8. In some implementations, a UE may execute a set of instructions to control the functional elements of the UE to perform the described functions. Additionally, or alternatively, the UE may perform aspects of the described functions using special-purpose hardware.

At 1005, the method may include receiving, via a control message, an indication of a CSI report configuration including a set of codebook parameters associated with a set of multiple codebooks, the set of multiple codebooks associated with multiple CSI measurements at the UE. The operations of 1005 may be performed in accordance with examples as disclosed herein. In some implementations, aspects of the operations of 1005 may be performed by a communications manager 820 as described with reference to FIG. 8.

At 1010, the method may include transmitting, via a CSI report, a set of CSI parameters for each of a subset of codebooks of the set of multiple codebooks. The operations of 1010 may be performed in accordance with examples as disclosed herein. In some implementations, aspects of the operations of 1010 may be performed by a communications manager 820 as described with reference to FIG. 8.

Figure 11:
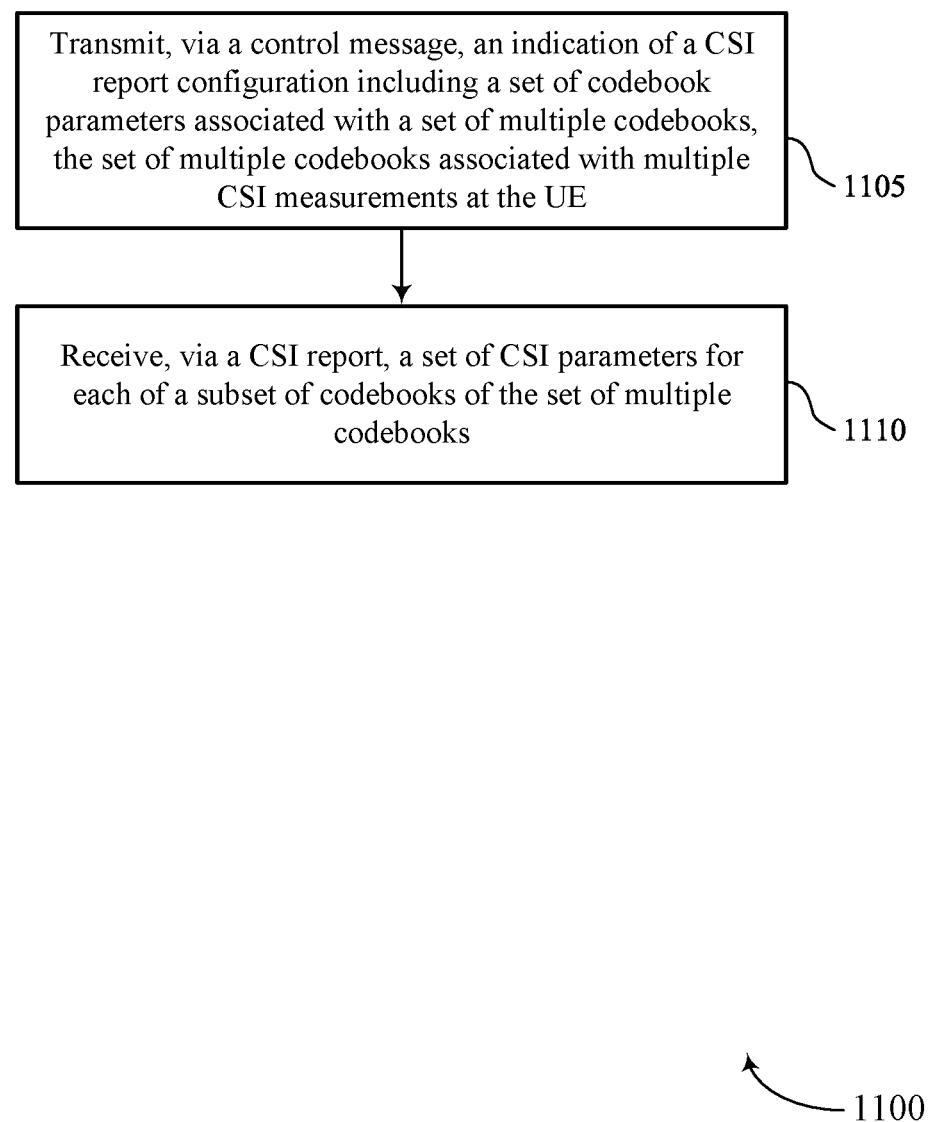

FIG. 11 shows a flowchart illustrating an example method 1100 that supports a CSI report structure for dynamic antenna port adaptation. The operations of the method 1100 may be implemented by a network entity or its components as described herein. For example, the operations of the method 1100 may be performed by a network entity as described with reference to FIGS. 1-9. In some implementations, a network entity may execute a set of instructions to control the functional elements of the network entity to perform the described functions. Additionally, or alternatively, the network entity may perform aspects of the described functions using special-purpose hardware.

At 1105, the method may include transmitting, via a control message, an indication of a CSI report configuration including a set of codebook parameters associated with a set of multiple codebooks, the set of multiple codebooks associated with multiple CSI measurements at a UE. The operations of 1105 may be performed in accordance with examples as disclosed herein. In some implementations, aspects of the operations of 1105 may be performed by a communications manager 920 as described with reference to FIG. 9.

At 1110, the method may include receiving, via a CSI report, a set of CSI parameters for each of a subset of codebooks of the set of multiple codebooks. The operations of 1110 may be performed in accordance with examples as disclosed herein. In some implementations, aspects of the operations of 1110 may be performed by a communications manager 920 as described with reference to FIG. 9.

The following provides an overview of some aspects of the present disclosure:

Aspect 1: An apparatus for wireless communication at a UE, including: an interface configured to obtain, via a control message, an indication of a CSI report configuration including a set of codebook parameters associated with a set of multiple codebooks, the set of multiple codebooks associated with a set of multiple CSI measurements at the UE; and output, via a CSI report, a set of CSI parameters for each of a subset of codebooks of the set of multiple codebooks.

Aspect 2: The apparatus of aspect 1, where, to output the set of CSI parameters for each of the subset of codebooks, the interface is further configured to: output, via a first part of the CSI report, a CQI parameter for a first codebook of the subset of codebooks; and output, via a second part of the CSI report, a CQI parameter for each of a remainder of the subset of codebooks.

Aspect 3: The apparatus of aspect 2, where: to output the first part of the CSI report, the interface is further configured to: output a CRI and an RI for each of the subset of codebooks; and to output the second part of the CSI report, the interface is further configured to: output a PMI and an LI for each of the subset of codebooks.

Aspect 4: The apparatus of any of aspects 2-3, where: to output the first part of the CSI report, the interface is further configured to: output a CRI for each of the subset of codebooks and an RI for the first codebook; and to output the second part of the CSI report, the interface is further configured to: output a PMI and an LI for each of the subset of codebooks and an RI for each of the remainder of the subset of codebooks.

Aspect 5: The apparatus of any of aspects 2-4, where the interface is further configured to: obtain an indication of the first codebook, where including the CQI parameter for the first codebook in the first part of the CSI report and including the CQI parameter for each of the remainder of the subset of codebooks in the second part of the CSI report are associated with obtaining the indication of the first codebook.

Aspect 6: The apparatus of any of aspects 2-5, where: each codebook of the subset of codebooks corresponds to a different antenna port configuration; and the first codebook corresponds to an antenna port configuration associated with a relatively greatest quantity of antenna ports per resource relative to a remainder of the subset of codebooks.

Aspect 7: The apparatus of any of aspects 2-6, where, to output the first part of the CSI report, the interface is further configured to: output an indication of the first codebook, where including the CQI parameter for the first codebook in the first part of the CSI report and including the CQI parameter for each of the remainder of the subset of codebooks in the second part of the CSI report are associated with outputting the indication of the first codebook.

Aspect 8: The apparatus of aspect 7, where the UE further includes a processing system configured to: select the first codebook from the subset of codebooks, where outputting the indication of the first codebook via the first part of the CSI report is associated with selecting the first codebook from the subset of codebooks.

Aspect 9: The apparatus of any of aspects 1-8, where the interface is further configured to: obtain an indication of an uplink resource for the CSI report, where outputting the CSI report using the uplink resource includes a dropping of one or more CSI parameters from one or both of a first part of the CSI report or a second part of the CSI report, and where the dropping is associated with a size of the uplink resource and a quantity of the subset of codebooks.

Aspect 10: The apparatus of aspect 9, where the interface is further configured to: obtain an indication of a first quantity of CSI parameters to maintain in the first part of the CSI report if a portion of the first part of the CSI report is to be dropped; and obtain an indication of a second quantity of CSI parameters to maintain in the second part of the CSI report if a portion of the second part of the CSI report is to be dropped.

Aspect 11: The apparatus of any of aspects 9-10, where the dropping is associated with an ordered dropping of a portion of the second part of the CSI report first, an entirety of the second part of the CSI report second, a portion of the first part of the CSI report third, and an entirety of the first part of the CSI report fourth until the CSI report fits within the size of the uplink resource.

Aspect 12: The apparatus of any of aspects 1-11, where, to output the CSI report, the interface is further configured to: output the CSI report using a long PUCCH in accordance with the CSI report including the set of CSI parameters for each of the subset of codebooks.

Aspect 13: The apparatus of any of aspects 1-12, where the set of codebook parameters associated with the set of multiple codebooks includes an antenna port configuration, a precoder restriction, and a rank restriction for each of the set of multiple codebooks.

Aspect 14: The apparatus of any of aspects 1-13, where the apparatus further includes a processing system configured to: compute the set of CSI parameters for each of the subset of codebooks in accordance with a set of one or more CSI reference signals (CSI-RSs) and in accordance with the set of codebook parameters.

Aspect 15: An apparatus for wireless communication at a network entity, including: an interface configured to: output, via a control message, an indication of a CSI report configuration including a set of codebook parameters associated with a set of multiple codebooks, the set of multiple codebooks associated with a set of multiple CSI measurements at a UE; and obtain, via a CSI report, a set of CSI parameters for each of a subset of codebooks of the set of multiple codebooks.

Aspect 16: The apparatus of aspect 15, where, to obtain the set of CSI parameters for each of the subset of codebooks, the interface is further configured to: obtain, via a first part of the CSI report, a CQI parameter for a first codebook of the subset of codebooks; and obtain, via a second part of the CSI report, a CQI parameter for each of a remainder of the subset of codebooks.

Aspect 17: The apparatus of aspect 16, where: to obtain the first part of the CSI report, the interface is further configured to: obtain a CRI and an RI for each of the subset of codebooks; and to obtain the second part of the CSI report, the interface is further configured to: obtain a PMI and an LI for each of the subset of codebooks.

Aspect 18: The apparatus of any of aspects 16-17, where: to obtain the first part of the CSI report, the interface is further configured to: obtain a CRI for each of the subset of codebooks and an RI for the first codebook; and to obtain the second part of the CSI report, the interface is further configured to: obtain a PMI and an LI for each of the subset of codebooks and an RI for each of the remainder of the subset of codebooks.

Aspect 19: The apparatus of any of aspects 16-18, where the interface is further configured to: output an indication of the first codebook, where obtaining the CQI parameter for the first codebook in the first part of the CSI report and obtaining the CQI parameter for each of the remainder of the subset of codebooks in the second part of the CSI report are associated with outputting the indication of the first codebook.

Aspect 20: The apparatus of any of aspects 16-19, where: each codebook of the subset of codebooks corresponds to a different antenna port configuration; and the first codebook corresponds to an antenna port configuration associated with a relatively greatest quantity of antenna ports per resource relative to a remainder of the subset of codebooks.

Aspect 21: The apparatus of any of aspects 16-20, where, to obtain the first part of the CSI report, the interface is further configured to: obtain an indication of the first codebook, where obtaining the CQI parameter for the first codebook in the first part of the CSI report and obtaining the CQI parameter for each of the remainder of the subset of codebooks in the second part of the CSI report are associated with obtaining the indication of the first codebook.

Aspect 22: The apparatus of any of aspects 15-20, where the interface is further configured to: output an indication of an uplink resource for the CSI report, where obtaining the CSI report using the uplink resource is associated with a dropping of one or more CSI parameters from one or both of a first part of the CSI report or a second part of the CSI report, and where the dropping is associated with a size of the uplink resource and a quantity of the subset of codebooks.

Aspect 23: The apparatus of aspect 22, where the interface is further configured to: output an indication of a first quantity of CSI parameters to maintain in the first part of the CSI report if a portion of the first part of the CSI report is to be dropped; and output an indication of a second quantity of CSI parameters to maintain in the second part of the CSI report if a portion of the second part of the CSI report is to be dropped.

Aspect 24: The apparatus of any of aspects 22-23, where the dropping is associated with an ordered dropping of a portion of the second part of the CSI report first, an entirety of the second part of the CSI report second, a portion of the first part of the CSI report third, and an entirety of the first part of the CSI report fourth until the CSI report fits within the size of the uplink resource.

Aspect 25: The apparatus of any of aspects 15-24, where, to obtain the CSI report, the interface is further configured to: obtain the CSI report using a long PUCCH in accordance with the CSI report including the set of CSI parameters for each of the subset of codebooks.

Aspect 26: The apparatus of any of aspects 15-25, where the set of codebook parameters associated with the set of multiple codebooks includes an antenna port configuration, a precoder restriction, and a rank restriction for each of the set of multiple codebooks.

Aspect 27: A method for wireless communication at a UE, including: receiving, via a control message, an indication of a CSI report configuration including a set of codebook parameters associated with a set of multiple codebooks, the set of multiple codebooks associated with a set of multiple CSI measurements at the UE; and transmitting, via a CSI report, a set of CSI parameters for each of a subset of codebooks of the set of multiple codebooks.

Aspect 28: The method of aspect 27, where transmitting the set of CSI parameters for each of the subset of codebooks includes: transmitting, via a first part of the CSI report, a CQI parameter for a first codebook of the subset of codebooks; and transmitting, via a second part of the CSI report, a CQI parameter for each of a remainder of the subset of codebooks.

Aspect 29: The method of aspect 28, where transmitting the first part of the CSI report further includes: transmitting a CRI and an RI for each of the subset of codebooks; and transmitting the second part of the CSI report further includes: transmitting a PMI and an LI for each of the subset of codebooks.

Aspect 30: The method of any of aspects 28-29, where transmitting the first part of the CSI report further includes: transmitting a CRI for each of the subset of codebooks and an RI for the first codebook; and transmitting the second part of the CSI report further includes: transmitting a PMI and an LI for each of the subset of codebooks and an RI for each of the remainder of the subset of codebooks.

Aspect 31: The method of any of aspects 28-30, further including: receiving an indication of the first codebook, where including the CQI parameter for the first codebook in the first part of the CSI report and including the CQI parameter for each of the remainder of the subset of codebooks is associated with receiving the indication of the first codebook.

Aspect 32: The method of any of aspects 28-31, where each codebook of the subset of codebooks corresponds to a different antenna port configuration; and the first codebook corresponds to an antenna port configuration associated with a relatively greatest quantity of antenna ports per resource relative to a remainder of the subset of codebooks.

Aspect 33: The method of aspect 32, where receiving the first part of the CSI report includes: transmitting an indication of the first codebook, where including the CQI parameter for the first codebook in the first part of the CSI report and including the CQI parameter for each of the remainder of the subset of codebooks is associated with transmitting the indication of the first codebook.

Aspect 34: The method of any of aspects 28-33, further including: selecting the first codebook from the subset of codebooks, where transmitting the indication of the first codebook via the first part of the CSI report is associated with selecting the first codebook from the subset of codebooks.

Aspect 35: The method of any of aspects 27-34, further including: receiving an indication of an uplink resource for the CSI report, where transmitting the CSI report using the uplink resource includes a dropping of one or more CSI parameters from one or both of a first part of the CSI report or a second part of the CSI report, and where the dropping is associated with a size of the uplink resource and a quantity of the subset of codebooks.

Aspect 36: The method of aspect 35, further including: receiving an indication of a first quantity of CSI parameters to maintain in the first part of the CSI report if a portion of the first part of the CSI report is to be dropped; and receiving an indication of a second quantity of CSI parameters to maintain in the second part of the CSI report if a portion of the second part of the CSI report is to be dropped.

Aspect 37: The method of any of aspects 35-36, where the dropping is associated with an ordered dropping of a portion of the second part of the CSI report first, an entirety of the second part of the CSI report second, a portion of the first part of the CSI report third, and an entirety of the first part of the CSI report fourth until the CSI report fits within the size of the uplink resource.

Aspect 38: The method of any of aspects 27-37, where transmitting the CSI report includes: transmitting the CSI report using a long PUCCH in accordance with the CSI report including the set of CSI parameters for each of the subset of codebooks.

Aspect 39: The method of any of aspects 27-38, where the set of codebook parameters associated with the set of multiple codebooks includes an antenna port configuration, a precoder restriction, and a rank restriction for each of the set of multiple codebooks.

Aspect 40: The method of any of aspects 27-39, further including: computing the set of CSI parameters for each of the subset of codebooks in accordance with a set of one or more CSI-RSs and in accordance with the set of codebook parameters.

Aspect 41: A method for wireless communication at a network entity, including: transmitting, via a control message, an indication of a CSI report configuration including a set of codebook parameters associated with a set of multiple codebooks, the set of multiple codebooks associated with a set of multiple CSI measurements at a UE; and receiving, via a CSI report, a set of CSI parameters for each of a subset of codebooks of the set of multiple codebooks.

Aspect 42: The method of aspect 41, where receiving the set of CSI parameters for each of the subset of codebooks includes: receiving, via a first part of the CSI report, a CQI parameter for a first codebook of the subset of codebooks; and receiving, via a second part of the CSI report, a CQI parameter for each of a remainder of the subset of codebooks.

Aspect 43: The method of aspect 42, where receiving the first part of the CSI report further includes: receiving a CRI and an RI for each of the subset of codebooks; and receiving the second part of the CSI report further includes: receiving a PMI and an LI for each of the subset of codebooks.

Aspect 44: The method of any of aspects 42-43, where receiving the first part of the CSI report further includes: receiving a CRI for each of the subset of codebooks and an RI for the first codebook; and receiving the second part of the CSI report further includes: receiving a PMI and an LI for each of the subset of codebooks and an RI for each of the remainder of the subset of codebooks.

Aspect 45: The method of any of aspects 42-44, further including: transmitting an indication of the first codebook, where receiving the CQI parameter for the first codebook in the first part of the CSI report and receiving the CQI parameter for each of the remainder of the subset of codebooks is associated with transmitting the indication of the first codebook.

Aspect 46: The method of any of aspects 42-45, where each codebook of the subset of codebooks corresponds to a different antenna port configuration, and the first codebook corresponds to an antenna port configuration associated with a relatively greatest quantity of antenna ports per resource relative to a remainder of the subset of codebooks.

Aspect 47: The method of any of aspects 42-46, where receiving the first part of the CSI report includes: receiving an indication of the first codebook, where receiving the CQI parameter for the first codebook in the first part of the CSI report and receiving the CQI parameter for each of the remainder of the subset of codebooks in the second part of the CSI report are associated with receiving the indication of the first codebook.

Aspect 48: The method of any of aspects 41-46, further including: transmitting an indication of an uplink resource for the CSI report, where receiving the CSI report using the uplink resource is associated with a dropping of one or more CSI parameters from one or both of a first part of the CSI report or a second part of the CSI report, and where the dropping is associated with a size of the uplink resource and a quantity of the subset of codebooks.

Aspect 49: The method of aspect 48, further including: transmitting an indication of a first quantity of CSI parameters to maintain in the first part of the CSI report if a portion of the first part of the CSI report is to be dropped; and transmitting an indication of a second quantity of CSI parameters to maintain in the second part of the CSI report if a portion of the second part of the CSI report is to be dropped.

Aspect 50: The method of any of aspects 48-49, where the dropping is associated with an ordered dropping of a portion of the second part of the CSI report first, an entirety of the second part of the CSI report second, a portion of the first part of the CSI report third, and an entirety of the first part of the CSI report fourth until the CSI report fits within the size of the uplink resource.

Aspect 51: The method of any of aspects 41-50, where receiving the CSI report includes: receiving the CSI report using a long PUCCH in accordance with the CSI report including the set of CSI parameters for each of the subset of codebooks.

Aspect 52: The method of any of aspects 41-51, where the set of codebook parameters associated with the set of multiple codebooks includes an antenna port configuration, a precoder restriction, and a rank restriction for each of the set of multiple codebooks.

Aspect 53: An apparatus for wireless communication at a UE, including: means for receiving, via a control message, an indication of a CSI report configuration including a set of codebook parameters associated with a set of multiple codebooks, the set of multiple codebooks associated with a set of multiple CSI measurements at the UE; and means for transmitting, via a CSI report, a set of CSI parameters for each of a subset of codebooks of the set of multiple codebooks.

Aspect 54: The apparatus of aspect 53, where the means for transmitting the set of CSI parameters for each of the subset of codebooks include: means for transmitting, via a first part of the CSI report, a CQI parameter for a first codebook of the subset of codebooks; and means for transmitting, via a second part of the CSI report, a CQI parameter for each of a remainder of the subset of codebooks.

Aspect 55: The apparatus of aspect 54, where transmitting the first part of the CSI report further includes: transmitting a CRI and an RI for each of the subset of codebooks; and transmitting the second part of the CSI report further includes: transmitting a PMI and an LI for each of the subset of codebooks.

Aspect 56: The apparatus of any of aspects 54-55, where transmitting the first part of the CSI report further includes: transmitting a CRI for each of the subset of codebooks and an RI for the first codebook; and transmitting the second part of the CSI report further includes: transmitting a PMI and an LI for each of the subset of codebooks and an RI for each of the remainder of the subset of codebooks.

Aspect 57: The apparatus of any of aspects 54-56, further including: means for receiving an indication of the first codebook, where including the CQI parameter for the first codebook in the first part of the CSI report and including the CQI parameter for each of the remainder of the subset of codebooks is associated with receiving the indication of the first codebook.

Aspect 58: The apparatus of any of aspects 54-57, where: each codebook of the subset of codebooks corresponds to a different antenna port configuration; and the first codebook corresponds to an antenna port configuration associated with a relatively greatest quantity of antenna ports per resource relative to a remainder of the subset of codebooks.

Aspect 59: The apparatus of aspect 58, where the means for receiving the first part of the CSI report include: means for transmitting an indication of the first codebook, where including the CQI parameter for the first codebook in the first part of the CSI report and including the CQI parameter for each of the remainder of the subset of codebooks is associated with transmitting the indication of the first codebook.

Aspect 60: The apparatus of any of aspects 54-59, further including: means for selecting the first codebook from the subset of codebooks, where transmitting the indication of the first codebook via the first part of the CSI report is associated with selecting the first codebook from the subset of codebooks.

Aspect 61: The apparatus of any of aspects 53-60, further including: means for receiving an indication of an uplink resource for the CSI report, where transmitting the CSI report using the uplink resource includes a dropping of one or more CSI parameters from one or both of a first part of the CSI report or a second part of the CSI report, and where the dropping is associated with a size of the uplink resource and a quantity of the subset of codebooks.

Aspect 62: The apparatus of aspect 61, further including: means for receiving an indication of a first quantity of CSI parameters to maintain in the first part of the CSI report if a portion of the first part of the CSI report is to be dropped; and means for receiving an indication of a second quantity of CSI parameters to maintain in the second part of the CSI report if a portion of the second part of the CSI report is to be dropped.

Aspect 63: The apparatus of any of aspects 61-62, where the dropping is associated with an ordered dropping of a portion of the second part of the CSI report first, an entirety of the second part of the CSI report second, a portion of the first part of the CSI report third, and an entirety of the first part of the CSI report fourth until the CSI report fits within the size of the uplink resource.

Aspect 64: The apparatus of any of aspects 53-63, where the means for transmitting the CSI report include: means for transmitting the CSI report using a long PUCCH in accordance with the CSI report including the set of CSI parameters for each of the subset of codebooks.

Aspect 65: The apparatus of any of aspects 53-64, where the set of codebook parameters associated with the set of multiple codebooks includes an antenna port configuration, a precoder restriction, and a rank restriction for each of the set of multiple codebooks.

Aspect 66: The apparatus of any of aspects 53-65, further including: means for computing the set of CSI parameters for each of the subset of codebooks in accordance with a set of one or more CSI-RSs and in accordance with the set of codebook parameters.

Aspect 67: An apparatus for wireless communication at a network entity, including: means for transmitting, via a control message, an indication of a CSI report configuration including a set of codebook parameters associated with a set of multiple codebooks, the set of multiple codebooks associated with a set of multiple CSI measurements at a UE; and means for receiving, via a CSI report, a set of CSI parameters for each of a subset of codebooks of the set of multiple codebooks.

Aspect 68: The apparatus of aspect 67, where the means for receiving the set of CSI parameters for each of the subset of codebooks include: means for receiving, via a first part of the CSI report, a CQI parameter for a first codebook of the subset of codebooks; and means for receiving, via a second part of the CSI report, a CQI parameter for each of a remainder of the subset of codebooks.

Aspect 69: The apparatus of aspect 68, where receiving the first part of the CSI report further includes: receiving a CRI and an RI for each of the subset of codebooks; and receiving the second part of the CSI report further includes: receiving a PMI and an LI for each of the subset of codebooks.

Aspect 70: The apparatus of any of aspects 68-69, where receiving the first part of the CSI report further includes: receiving a CRI for each of the subset of codebooks and an RI for the first codebook; and receiving the second part of the CSI report further includes: receiving a PMI and an LI for each of the subset of codebooks and an RI for each of the remainder of the subset of codebooks.

Aspect 71: The apparatus of any of aspects 68-70, further including: means for transmitting an indication of the first codebook, where receiving the CQI parameter for the first codebook in the first part of the CSI report and receiving the CQI parameter for each of the remainder of the subset of codebooks is associated with transmitting the indication of the first codebook.

Aspect 72: The apparatus of any of aspects 68-71, where: each codebook of the subset of codebooks corresponds to a different antenna port configuration, and the first codebook corresponds to an antenna port configuration associated with a relatively greatest quantity of antenna ports per resource relative to a remainder of the subset of codebooks.

Aspect 73: The apparatus of any of aspects 68-72, where the means for receiving the first part of the CSI report include: means for receiving an indication of the first codebook, where receiving the CQI parameter for the first codebook in the first part of the CSI report and receiving the CQI parameter for each of the remainder of the subset of codebooks in the second part of the CSI report are associated with receiving the indication of the first codebook.

Aspect 74: The apparatus of any of aspects 67-72, further including: means for transmitting an indication of an uplink resource for the CSI report, where receiving the CSI report using the uplink resource is associated with a dropping of one or more CSI parameters from one or both of a first part of the CSI report or a second part of the CSI report, and where the dropping is associated with a size of the uplink resource and a quantity of the subset of codebooks.

Aspect 75: The apparatus of aspect 74, further including: means for transmitting an indication of a first quantity of CSI parameters to maintain in the first part of the CSI report if a portion of the first part of the CSI report is to be dropped; and means for transmitting an indication of a second quantity of CSI parameters to maintain in the second part of the CSI report if a portion of the second part of the CSI report is to be dropped.

Aspect 76: The apparatus of any of aspects 74-75, where the dropping is associated with an ordered dropping of a portion of the second part of the CSI report first, an entirety of the second part of the CSI report second, a portion of the first part of the CSI report third, and an entirety of the first part of the CSI report fourth until the CSI report fits within the size of the uplink resource.

Aspect 77: The apparatus of any of aspects 67-76, where the means for receiving the CSI report include: means for receiving the CSI report using a long PUCCH in accordance with the CSI report including the set of CSI parameters for each of the subset of codebooks.

Aspect 78: The apparatus of any of aspects 67-77, where the set of codebook parameters associated with the set of multiple codebooks includes an antenna port configuration, a precoder restriction, and a rank restriction for each of the set of multiple codebooks.

Aspect 79: A non-transitory computer-readable medium storing code for wireless communication at a UE, the code including instructions executable by a processor to: receive, via a control message, an indication of a CSI report configuration including a set of codebook parameters associated with a set of multiple codebooks, the set of multiple codebooks associated with a set of multiple CSI measurements at the UE; and transmit, via a CSI report, a set of CSI parameters for each of a subset of codebooks of the set of multiple codebooks.

Aspect 80: The non-transitory computer-readable medium of aspect 79, where the instructions to transmit the set of CSI parameters for each of the subset of codebooks are executable by the processor to: transmit, via a first part of the CSI report, a CQI parameter for a first codebook of the subset of codebooks; and transmit, via a second part of the CSI report, a CQI parameter for each of a remainder of the subset of codebooks.

Aspect 81: The non-transitory computer-readable medium of aspect 80, where transmitting the first part of the CSI report further includes: transmitting a CRI and an RI for each of the subset of codebooks; and transmitting the second part of the CSI report further includes: transmitting a PMI and an LI for each of the subset of codebooks.

Aspect 82: The non-transitory computer-readable medium of any of aspects 80-81, where transmitting the first part of the CSI report further includes: transmitting a CRI for each of the subset of codebooks and an RI for the first codebook; and transmitting the second part of the CSI report further includes: transmitting a PMI and an LI for each of the subset of codebooks and an RI for each of the remainder of the subset of codebooks.

Aspect 83: The non-transitory computer-readable medium of any of aspects 80-82, where the instructions are further executable by the processor to: receive an indication of the first codebook, where including the CQI parameter for the first codebook in the first part of the CSI report and including the CQI parameter for each of the remainder of the subset of codebooks is associated with receiving the indication of the first codebook.

Aspect 84: The non-transitory computer-readable medium of any of aspects 80-83, where: each codebook of the subset of codebooks corresponds to a different antenna port configuration; and the first codebook corresponds to an antenna port configuration associated with a relatively greatest quantity of antenna ports per resource relative to a remainder of the subset of codebooks.

Aspect 85: The non-transitory computer-readable medium of aspect 84, where the instructions to receive the first part of the CSI report are executable by the processor to: transmit an indication of the first codebook, where including the CQI parameter for the first codebook in the first part of the CSI report and including the CQI parameter for each of the remainder of the subset of codebooks is associated with transmitting the indication of the first codebook.

Aspect 86: The non-transitory computer-readable medium of any of aspects 80-85, where the instructions are further executable by the processor to: select the first codebook from the subset of codebooks, where transmitting the indication of the first codebook via the first part of the CSI report is associated with selecting the first codebook from the subset of codebooks.

Aspect 87: The non-transitory computer-readable medium of any of aspects 79-86, where the instructions are further executable by the processor to: receive an indication of an uplink resource for the CSI report, where transmitting the CSI report using the uplink resource includes a dropping of one or more CSI parameters from one or both of a first part of the CSI report or a second part of the CSI report, and where the dropping is associated with a size of the uplink resource and a quantity of the subset of codebooks.

Aspect 88: The non-transitory computer-readable medium of aspect 87, where the instructions are further executable by the processor to: receive an indication of a first quantity of CSI parameters to maintain in the first part of the CSI report if a portion of the first part of the CSI report is to be dropped; and receive an indication of a second quantity of CSI parameters to maintain in the second part of the CSI report if a portion of the second part of the CSI report is to be dropped.

Aspect 89: The non-transitory computer-readable medium of any of aspects 87-88, where the dropping is associated with an ordered dropping of a portion of the second part of the CSI report first, an entirety of the second part of the CSI report second, a portion of the first part of the CSI report third, and an entirety of the first part of the CSI report fourth until the CSI report fits within the size of the uplink resource.

Aspect 90: The non-transitory computer-readable medium of any of aspects 79-89, where the instructions to transmit the CSI report are executable by the processor to: transmit the CSI report using a long PUCCH in accordance with the CSI report including the set of CSI parameters for each of the subset of codebooks.

Aspect 91: The non-transitory computer-readable medium of any of aspects 79-90, where the set of codebook parameters associated with the set of multiple codebooks includes an antenna port configuration, a precoder restriction, and a rank restriction for each of the set of multiple codebooks.

Aspect 92: The non-transitory computer-readable medium of any of aspects 79-91, where the instructions are further executable by the processor to: compute the set of CSI parameters for each of the subset of codebooks in accordance with a set of one or more CSI reference signals (CSI-RSs) and in accordance with the set of codebook parameters.

Aspect 93: A non-transitory computer-readable medium storing code for wireless communication at a network entity, the code including instructions executable by a processor to: transmit, via a control message, an indication of a CSI report configuration including a set of codebook parameters associated with a set of multiple codebooks, the set of multiple codebooks associated with a set of multiple CSI measurements at a UE; and receive, via a CSI report, a set of CSI parameters for each of a subset of codebooks of the set of multiple codebooks.

Aspect 94: The non-transitory computer-readable medium of aspect 93, where the instructions to receive the set of CSI parameters for each of the subset of codebooks are executable by the processor to: receive, via a first part of the CSI report, a CQI parameter for a first codebook of the subset of codebooks; and receive, via a second part of the CSI report, a CQI parameter for each of a remainder of the subset of codebooks.

Aspect 95: The non-transitory computer-readable medium of aspect 94, where receiving the first part of the CSI report further includes: receiving a CRI and an RI for each of the subset of codebooks; and receiving the second part of the CSI report further includes: receiving a PMI and an LI for each of the subset of codebooks.

Aspect 96: The non-transitory computer-readable medium of any of aspects 94-95, where receiving the first part of the CSI report further includes: receiving a CRI for each of the subset of codebooks and an RI for the first codebook; and receiving the second part of the CSI report further includes: receiving a PMI and an LI for each of the subset of codebooks and an RI for each of the remainder of the subset of codebooks.

Aspect 97: The non-transitory computer-readable medium of any of aspects 94-96, where the instructions are further executable by the processor to: transmit an indication of the first codebook, where receiving the CQI parameter for the first codebook in the first part of the CSI report and receiving the CQI parameter for each of the remainder of the subset of codebooks is associated with transmitting the indication of the first codebook.

Aspect 98: The non-transitory computer-readable medium of any of aspects 94-97, where: each codebook of the subset of codebooks corresponds to a different antenna port configuration, and the first codebook corresponds to an antenna port configuration associated with a relatively greatest quantity of antenna ports per resource relative to a remainder of the subset of codebooks.

Aspect 99: The non-transitory computer-readable medium of any of aspects 94-97, where the instructions to receive the first part of the CSI report are further executable by the processor to: receive an indication of the first codebook, where receiving the CQI parameter for the first codebook in the first part of the CSI report and receiving the CQI parameter for each of the remainder of the subset of codebooks in the second part of the CSI report are associated with receiving the indication of the first codebook.

Aspect 100: The non-transitory computer-readable medium of any of aspects 93-98, where the instructions are further executable by the processor to: transmit an indication of an uplink resource for the CSI report, where receiving the CSI report using the uplink resource is associated with a dropping of one or more CSI parameters from one or both of a first part of the CSI report or a second part of the CSI report, and where the dropping is associated with a size of the uplink resource and a quantity of the subset of codebooks.

Aspect 101: The non-transitory computer-readable medium of aspect 100, where the instructions are further executable by the processor to: transmit an indication of a first quantity of CSI parameters to maintain in the first part of the CSI report if a portion of the first part of the CSI report is to be dropped; and transmit an indication of a second quantity of CSI parameters to maintain in the second part of the CSI report if a portion of the second part of the CSI report is to be dropped.

Aspect 102: The non-transitory computer-readable medium of any of aspects 100-101, where the dropping is associated with an ordered dropping of a portion of the second part of the CSI report first, an entirety of the second part of the CSI report second, a portion of the first part of the CSI report third, and an entirety of the first part of the CSI report fourth until the CSI report fits within the size of the uplink resource.

Aspect 103: The non-transitory computer-readable medium of any of aspects 93-102, where the instructions to receive the CSI report are executable by the processor to: receive the CSI report using a long PUCCH in accordance with the CSI report including the set of CSI parameters for each of the subset of codebooks.

Aspect 104: The non-transitory computer-readable medium of any of aspects 93-103, where the set of codebook parameters associated with the set of multiple codebooks includes an antenna port configuration, a precoder restriction, and a rank restriction for each of the set of multiple codebooks.

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, and the like. Also, "determining" can include receiving (such as receiving information), accessing (such as accessing data in a memory) and the like. Also, "determining" can include resolving, selecting, choosing, establishing and other such similar actions.

As used herein, a phrase referring to "at least one of" a list of items refers to any combination of those items, including single members. As an example, "at least one of a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, such as one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in some combinations and even initially claimed as such, one or more features from a claimed combination can be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some implementations, the actions recited in the claims can be performed in a different order and still achieve desirable results.

What is claimed is:

1. An apparatus for wireless communication at a user equipment (UE), comprising:
an interface configured to
obtain, via a control message, an indication of a channel state information (CSI) report configuration including a set of codebook parameters associated with a plurality of codebooks, the plurality of codebooks associated with a plurality of CSI measurements at the UE; and
output, via a CSI report, a set of CSI parameters for each of a subset of codebooks of the plurality of codebooks, wherein to output the set of CSI parameters for each of the subset of codebooks, the interface is further configured to:
output, via a first part of the CSI report, a channel quality indicator (CQI) parameter for a first codebook of the subset of codebooks; and output, via a second part of the CSI report, a CQI parameter for each of a remainder of the subset of codebooks.

2. The apparatus of claim 1, wherein:
to output the first part of the CSI report, the interface is further configured to:
output a CSI reference signal (CSI-RS) resource indicator (CRI) and a rank indication (RI) for each of the subset of codebooks; and
to output the second part of the CSI report, the interface is further configured to:
output a precoding matrix indicator (PMI) and a layer indicator (LI) for each of the subset of codebooks.

3. The apparatus of claim 1, wherein:
to output the first part of the CSI report, the interface is further configured to:
output a CSI reference signal (CSI-RS) resource indicator (CRI) for each of the subset of codebooks and a rank indication (RI) for the first codebook; and
to output the second part of the CSI report, the interface is further configured to:
output a precoding matrix indicator (PMI) and a layer indicator (LI) for each of the subset of codebooks and an RI for each of the remainder of the subset of codebooks.

4. The apparatus of claim 1, wherein the interface is further configured to:
obtain an indication of the first codebook, wherein including the CQI parameter for the first codebook in the first part of the CSI report and including the CQI parameter for each of the remainder of the subset of codebooks in the second part of the CSI report are associated with obtaining the indication of the first codebook.

5. The apparatus of claim 1, wherein:
each codebook of the subset of codebooks corresponds to a different antenna port configuration; and
the first codebook corresponds to an antenna port configuration associated with a relatively greatest quantity of antenna ports per resource relative to a remainder of the subset of codebooks.

6. The apparatus of claim 1, wherein, to output the first part of the CSI report, the interface is further configured to:
output an indication of the first codebook, wherein including the CQI parameter for the first codebook in the first part of the CSI report and including the CQI parameter for each of the remainder of the subset of codebooks in the second part of the CSI report are associated with outputting the indication of the first codebook.

7. The apparatus of claim 6, wherein the UE further comprises a processing system configured to:
select the first codebook from the subset of codebooks, wherein outputting the indication of the first codebook via the first part of the CSI report is associated with selecting the first codebook from the subset of codebooks.

8. The apparatus of claim 1, wherein the interface is further configured to:
obtain an indication of an uplink resource for the CSI report, wherein outputting the CSI report using the uplink resource comprises a dropping of one or more CSI parameters from one or both of a first part of the CSI report or a second part of the CSI report, and wherein the dropping is associated with a size of the uplink resource and a quantity of the subset of codebooks.

9. The apparatus of claim 8, wherein the interface is further configured to:

obtain an indication of a first quantity of CSI parameters to maintain in the first part of the CSI report if a portion of the first part of the CSI report is to be dropped; and
obtain an indication of a second quantity of CSI parameters to maintain in the second part of the CSI report if a portion of the second part of the CSI report is to be dropped.

10. The apparatus of claim 8, wherein the dropping is associated with an ordered dropping of a portion of the second part of the CSI report first, an entirety of the second part of the CSI report second, a portion of the first part of the CSI report third, and an entirety of the first part of the CSI report fourth until the CSI report fits within the size of the uplink resource.

11. The apparatus of claim 1, wherein, to output the CSI report, the interface is further configured to:
output the CSI report using a long physical uplink control channel (PUCCH) in accordance with the CSI report including the set of CSI parameters for each of the subset of codebooks.

12. The apparatus of claim 1, wherein the set of codebook parameters associated with the plurality of codebooks comprises an antenna port configuration, a precoder restriction, and a rank restriction for each of the plurality of codebooks.

13. The apparatus of claim 1, wherein the apparatus further comprises a processing system configured to:
compute the set of CSI parameters for each of the subset of codebooks in accordance with a set of one or more CSI reference signals (CSI-RSs) and in accordance with the set of codebook parameters.

14. An apparatus for wireless communication at a network entity, comprising:
an interface configured to:
output, via a control message, an indication of a channel state information (CSI) report configuration including a set of codebook parameters associated with a plurality of codebooks, the set of multiple codebooks associated with a plurality of CSI measurements at a user equipment (UE); and
obtain, via a CSI report, a set of CSI parameters for each of a subset of codebooks of the plurality of codebooks, wherein, to obtain the set of CSI parameters for each of the subset of codebooks, the interface is further configured to:
obtain, via a first part of the CSI report, a channel quality indicator (CQI) parameter for a first codebook of the subset of codebooks; and
obtain, via a second part of the CSI report, a CQI parameter for each of a remainder of the subset of codebooks.

15. The apparatus of claim 14, wherein:
to obtain the first part of the CSI report, the interface is further configured to:
obtain a CSI reference signal (CSI-RS) resource indicator (CRI) and a rank indication (RI) for each of the subset of codebooks; and
to obtain the second part of the CSI report, the interface is further configured to:
obtain a precoding matrix indicator (PMI) and a layer indicator (LI) for each of the subset of codebooks.

16. The apparatus of claim 14, wherein:
to obtain the first part of the CSI report, the interface is further configured to:
obtain a CSI reference signal (CSI-RS) resource indicator (CRI) for each of the subset of codebooks and a rank indication (RI) for the first codebook; and to obtain the second part of the CSI report, the interface is further configured to:
obtain a precoding matrix indicator (PMI) and a layer indicator (LI) for each of the subset of codebooks and an RI for each of the remainder of the subset of codebooks.

17. A method for wireless communication at a user equipment (UE), comprising:
receiving, via a control message, an indication of a channel state information (CSI) report configuration including a set of codebook parameters associated with a plurality of codebooks, the plurality of codebooks associated with a plurality of CSI measurements at the UE; and
transmitting, via a CSI report, a set of CSI parameters for each of a subset of codebooks of the plurality of codebooks, the transmitting further comprising:
transmitting, via a first part of the CSI report, a channel quality indicator (CQI) parameter for a first codebook of the subset of codebooks; and
transmitting, via a second part of the CSI report, a CQI parameter for each of a remainder of the subset of codebooks.

18. The method of claim 17, wherein:
transmitting the first part of the CSI report further comprises:
transmitting a CSI reference signal (CSI-RS) resource indicator (CRI) and a rank indication (RI) for each of the subset of codebooks; and
transmitting the second part of the CSI report further comprises:
transmitting a precoding matrix indicator (PMI) and a layer indicator (LI) for each of the subset of codebooks.

19. The method of claim 17, wherein:
transmitting the first part of the CSI report further comprises:
transmitting a CSI reference signal (CSI-RS) resource indicator (CRI) for each of the subset of codebooks and a rank indication (RI) for the first codebook; and
transmitting the second part of the CSI report further comprises:
transmitting a precoding matrix indicator (PMI) and a layer indicator (LI) for each of the subset of codebooks and an RI for each of the remainder of the subset of codebooks.

20. The method of claim 17, further comprising:
receiving an indication of the first codebook, wherein including the CQI parameter for the first codebook in the first part of the CSI report and including the CQI parameter for each of the remainder of the subset of codebooks in the second part of the CSI report are associated with receiving the indication of the first codebook.

21. The method of claim 17, wherein:
each codebook of the subset of codebooks corresponds to a different antenna port configuration; and the first codebook corresponds to an antenna port configuration associated with a relatively greatest quantity of antenna ports per resource relative to a remainder of the subset of codebooks.

22. The method of claim 21, wherein transmitting the first part of the CSI report comprises:
transmitting an indication of the first codebook, wherein including the CQI parameter for the first codebook in the first part of the CSI report and including the CQI parameter for each of the remainder of the subset of codebooks in the second part of the CSI report are associated with transmitting the indication of the first codebook.

23. The method of claim 17, further comprising:
selecting the first codebook from the subset of codebooks, wherein transmitting the indication of the first codebook via the first part of the CSI report is associated with selecting the first codebook from the subset of codebooks.

24. The method of claim 17, further comprising:
receiving an indication of an uplink resource for the CSI report, wherein transmitting the CSI report using the uplink resource comprises a dropping of one or more CSI parameters from one or both of a first part of the CSI report or a second part of the CSI report, and wherein the dropping is associated with a size of the uplink resource and a quantity of the subset of codebooks.

25. A method for wireless communication at a network entity, comprising:
transmitting, via a control message, an indication of a channel state information (CSI) report configuration including a set of codebook parameters associated with a plurality of codebooks, the plurality of codebooks associated with a plurality of CSI measurements at a user equipment (UE); and
receiving, via a CSI report, a set of CSI parameters for each of a subset of codebooks of the plurality of codebooks, the receiving further comprising:
receiving, via a first part of the CSI report, a channel quality indicator (CQI) parameter for a first codebook of the subset of codebooks; and
receiving, via a second part of the CSI report, a CQI parameter for each of a remainder of the subset of codebooks.

26. The method of claim 25, wherein:
receiving the first part of the CSI report further comprises:
receiving a CSI reference signal (CSI-RS) resource indicator (CRI) and a rank indication (RI) for each of the subset of codebooks; and
receiving the second part of the CSI report further comprises:
receiving a precoding matrix indicator (PMI) and a layer indicator (LI) for each of the subset of codebooks.

* * * * *